(12) United States Patent
Ahadi et al.

(10) Patent No.: US 11,933,545 B2
(45) Date of Patent: Mar. 19, 2024

(54) FLUID MIXING MANIFOLD IN STABILIZED THERMAL ENERGY OUTPUT SYSTEM

(71) Applicant: Kelvin Thermal Energy Inc., Toronto (CA)

(72) Inventors: Amirhossein Ahadi, Toronto (CA); George Lynch, Escondido, CA (US); Adam Crocker, San Diego, CA (US); Stephen Sutherland, Aurora (CA)

(73) Assignee: Kelvin Thermal Energy Inc., Toronto (CA)

( * ) Notice: Subject to any disclaimer, the term of this patent is extended or adjusted under 35 U.S.C. 154(b) by 0 days.

(21) Appl. No.: 17/459,813

(22) Filed: Aug. 27, 2021

(65) Prior Publication Data
US 2022/0003508 A1 Jan. 6, 2022

Related U.S. Application Data

(63) Continuation of application No. 16/014,638, filed on Jun. 21, 2018, now abandoned.

(30) Foreign Application Priority Data

Jun. 22, 2017 (WO) ................ PCT/CA2017/000161

(51) Int. Cl.
*F28D 20/00* (2006.01)
*B01F 25/42* (2022.01)
(Continued)

(52) U.S. Cl.
CPC .............. *F28D 20/00* (2013.01); *B01F 25/42* (2022.01); *F28D 20/0056* (2013.01);
(Continued)

(58) Field of Classification Search
CPC ................. F28D 20/00; F28D 20/0056; F28D 2020/0021; F28D 2020/0026;
(Continued)

(56) References Cited

U.S. PATENT DOCUMENTS 3,831,350 A * 8/1974 Gilles ...................... F15D 1/02
454/309
3,928,199 A * 12/1975 Kirk .......................... C02F 3/26
210/150

(Continued)

OTHER PUBLICATIONS

U.S. Appl. No. 16/014,638, filed Jun. 21, 2018.
(Continued)

*Primary Examiner* — Charles Cooley
(74) *Attorney, Agent, or Firm* — Laurie Wright; Christopher N. Hunter; Blake, Cassels & Graydon LLP

(57) ABSTRACT

A thermal energy storage system utilizes a high temperature storage segment having flow passages extending through the storage segment whereby a working fluid can extract energy from the storage system for powering conventional downstream equipment. A mixing manifold cooperates with an outlet manifold for reducing the temperature of the working fluid to a temperature safe for the downstream equipment. The mixing manifold, an outlet manifold, an inlet manifold and a support base for the high temperature storage segment, are all of a high temperature tolerant material allowing the high temperature storage segment to operate at temperatures in excess of 1000° C. and preferably to temperatures above 1400° C. The temperature of the working fluid provided to the conventional equipment can be managed to be below a maximum temperature which in many cases may be about 700° C.

16 Claims, 22 Drawing Sheets

(51) Int. Cl.
*F28F 21/02* (2006.01)
*F28F 21/04* (2006.01)
*G05D 23/13* (2006.01)
*H05B 1/02* (2006.01)

(52) U.S. Cl.
CPC .............. *F28F 21/02* (2013.01); *F28F 21/04* (2013.01); *G05D 23/13* (2013.01); *H05B 1/0297* (2013.01); *F28D 2020/0021* (2013.01); *F28D 2020/0026* (2013.01); *F28D 2020/0069* (2013.01); *F28D 2020/0078* (2013.01); *F28D 2020/0086* (2013.01)

(58) Field of Classification Search
CPC ..... F28D 2020/0086; F28D 2020/0069; F28D 2020/0078; F28F 21/04; F28F 21/02; F28F 9/02; G05D 23/13; H05B 1/0297; Y02E 60/14; B01F 5/0644
USPC ....................................... 366/181.5, 336–340
See application file for complete search history.

(56) References Cited

U.S. PATENT DOCUMENTS

| | | | | |
|---|---|---|---|---|
| 4,068,830 A * | 1/1978 | Gray | ................... | B01F 25/4521 366/175.2 |
| 5,749,651 A * | 5/1998 | Huttenhofer | .......... | F01N 3/2066 366/337 |
| 6,086,241 A * | 7/2000 | Herr | ........................ | B01F 25/43 366/337 |
| 6,331,072 B1 * | 12/2001 | Schierholz | .......... | B01F 25/4331 366/338 |
| 7,063,817 B2 * | 6/2006 | Sigling | .............. | B01D 53/8631 422/171 |
| 8,272,777 B2 * | 9/2012 | Kohrs | ................. | B01F 25/4322 366/337 |
| 2005/0190643 A1 * | 9/2005 | Hansen | ............... | B01F 25/3131 366/337 |
| 2013/0188440 A1 * | 7/2013 | Tabikh | ................ | B01F 25/4316 366/181.5 |
| 2015/0092512 A1 * | 4/2015 | Bedoukian | .............. | B01F 31/57 366/144 |
| 2018/0372420 A1 * | 12/2018 | Ahadi | ........................ | F28F 9/02 |
| 2021/0261846 A1 * | 8/2021 | Danaei | ..................... | C09K 5/14 |

OTHER PUBLICATIONS

Samborski, M.; International Search Report issued in connection with priority PCT Application No. PCT/CA2017/000161; search report completed Sep. 29, 2017.

Axters, M.; Extended European Search Report issued in connection with corresponding European Application No. 23170153.3; search report completed Jun. 20, 2023.

* cited by examiner

FLUID MIXING MANIFOLD IN STABILIZED THERMAL ENERGY OUTPUT SYSTEM This application is a continuation of U.S. application Ser. No. 16/014,638 filed on Jun. 21, 2018, which claims priority from International PCT application no. PCT/CA2017/000161, filed on Jun. 22, 2017, the disclosures of which are hereby incorporated by reference in their entireties.

FIELD OF THE INVENTION

The present invention relates to thermal energy storage and transfer arrangements and, in particular, relates to such arrangements that include a thermal energy storage segment and energy transfer fluid.

BACKGROUND OF THE INVENTION

For many years, graphite based thermal energy storage systems typically heated with electrical heating elements, have been recognized as being conceptually capable of operating at ultra high temperatures. An example of a graphite based thermal energy storage device is disclosed in Applicant's earlier applications, namely, Canadian Patent Application No. 2,780,437 and United States Patent Application Publication No. 2015/0219404 A1. PCT Publication No. WO 2015/085357 A1, filed by Graphite Energy N.V also discloses a graphite based system.

Although the graphite storage medium can theoretically operate at temperatures in excess of 3000° C., a problem exists when the temperature of the output heat transfer fluid (used to extract and deliver thermal energy) is in excess of what the downstream equipment (typically traditional connecting components and heat exchangers limited to about 700° C.) can tolerate. For energy density and efficiency reasons it is desirable to operate the graphite storage body at temperatures considerably higher than what this equipment tolerates. For example, the use of high temperature steel components becomes difficult or unstable at about 850° C. and advancements in turbine and heat exchanger designs still limit their tolerance to temperatures well below that of the graphite medium itself.

A thermal energy transfer fluid is circulated through the graphite body when thermal energy is to be removed and typically exits the storage system at, or very near, the temperature of the graphite body. Thus, the maximum operating temperature of the graphite medium is limited by the thermal tolerance of the components located at the output and downstream of the storage system.

A further limitation to the maximum operating temperature of the graphite medium relates to the thermal resistance of the supporting structure. Ultra-high temperature graphite cores must he surrounded with materials such as carbon foam to insulate the outer vessel from the high temperature core. Due to the weight of the graphite core, the support structure under the core must be constructed of stronger materials which typically have lower insulating capabilities.

The present invention provides a structure and method for operating a high temperature energy storage body at temperatures in excess of about 700° C. and preferably in excess of 1000° C. while ensuring that the output thermal energy transfer fluid does not exceed thermal tolerances of the external components. The present invention further enables the effective use of stronger, less insulative materials to support the graphite core in a thermal energy storage system.

SUMMARY OF THE INVENTION

A fluid flow mixing manifold for reducing the temperature of a thermal energy transfer working fluid to a temperature that can be utilized as a working fluid input for conventional equipment according to the present invention comprises a divided housing that includes a thermal energy discharge port, a working fluid input port and a cooling mixing flow input port in conjunction with a fluid distribution manifold which includes these fluid flows plus a further cooling input port to cool the outer case of the connecting system. The divided housing includes a mixing chamber with the cooling mixing flow input port and the thermal energy working fluid input port in communication with an input end of the mixing chamber. The mixing chamber includes a series of mixing members that cause the thermal energy transfer working fluid arriving from the graphite body to blend with the cooling mixing fluid before exiting via the thermal energy working fluid discharge port located at an output end of the mixing manifold. Both the distribution and the mixing manifolds are designed and of a material suitable for operating at temperatures in excess of 1000° C. with the exception of the outermost structure of the distribution manifold which may be made of lower temperature materials similar to those of the downstream equipment.

According to an aspect of the invention, the series of mixing members are baffles provided in the mixing chamber which also serve to block energy radiating from the graphite body.

In a further aspect of the invention, the fluid flow-mixing manifold is of a ceramic material.

According to a preferred aspect of the invention, the mixing manifold includes a controller that monitors the temperature of each of the fluid flows outside of the system adjacent the output of the distribution manifold. The controller includes an arrangement for regulating the volume of each of the input flows to produce a net volume of heated working fluid exiting the system delivering the precise amount of thermal energy required for external equipment.

The controller regulates the fluid flows passing through the input ports to cause mixed fluid flow passing through the output port to be at a temperature safe for downstream equipment and typically below approximately 700° C. By varying the volume of fluid, the controller further ensures that the returning working fluid, after such downstream equipment has utilized some of the transported thermal energy, has a sufficiently lower temperature than the delivered working fluid such that this retiring fluid is effective for the mixing and cooling operations within the system.

The invention is also directed to a ceramic base that supports a high temperature thermal storage body. The ceramic base includes one or more cooling channels that act as a thermal separating segment positioned between the hot thermal storage body and a cool lower portion of the base. A fluid can circulate through these cooling channels as necessary to provide this thermal separation.

BRIEF DESCRIPTION OF THE DRAWINGS

Preferred embodiments of the invention are shown in the drawings, wherein;

FIG. 5c is an end view of the mixing manifold of FIG. 5a;

DETAILED DESCRIPTION OF THE PREFERRED EMBODIMENTS

Figure 1:
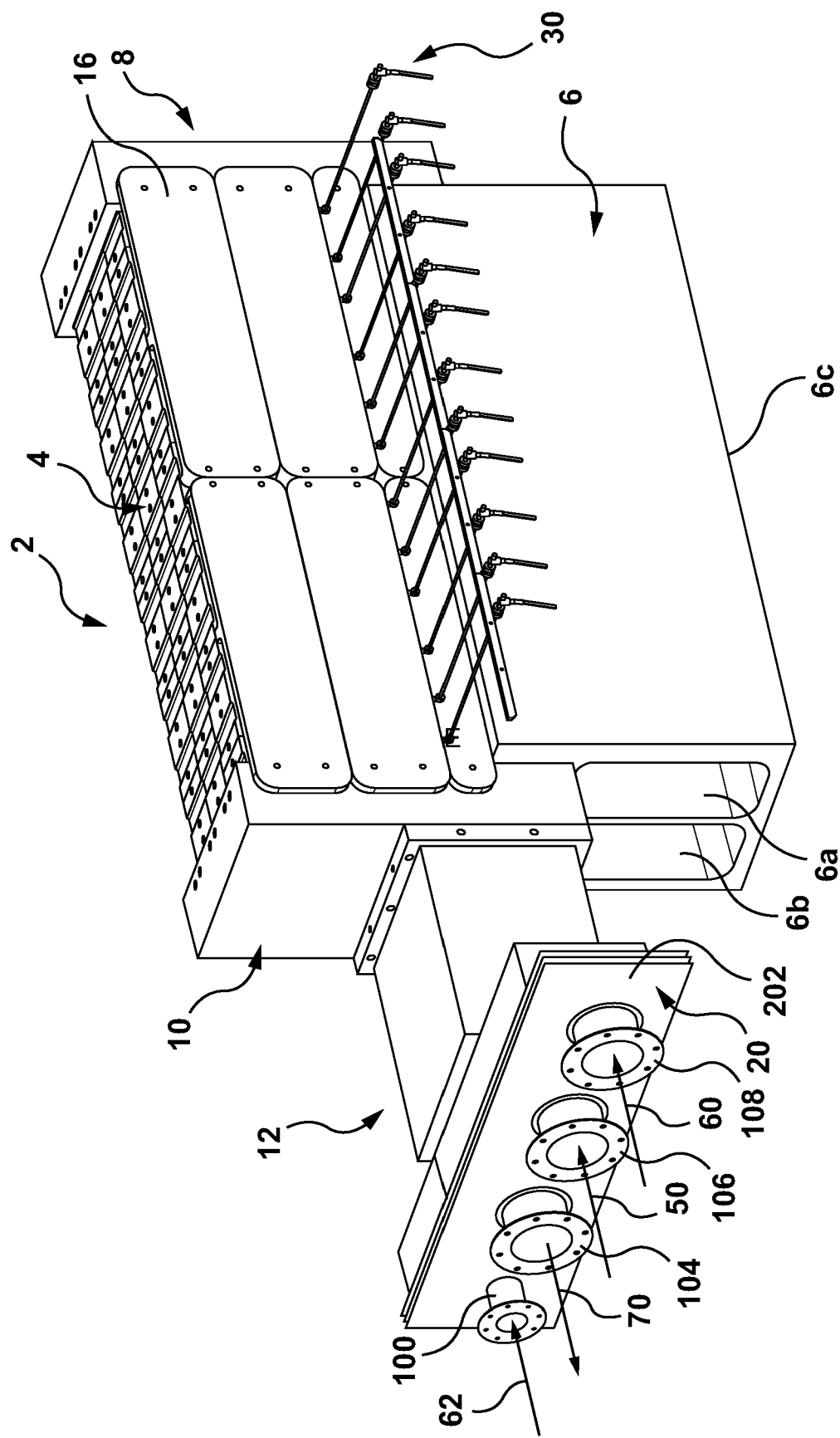
FIG. 1 is a perspective view of the working components of the high temperature thermal energy storage and transfer arrangement without any insulation and external container or conventional support structure being shown.

FIG. 1 generally shows the high temperature thermal energy storage and transfer arrangement 2 where enveloping insulation and an associated containment vessel have not been shown. In one embodiment, the containment vessel is a bulk shipping container sized for shipping by truck. The working, components of the storage and transfer arrangement are clearly illustrated. The graphite storage segment 4 rest on top of a support block 6 that is made of a high temperature ceramic material. The ceramic material is chosen to provide minimal thermal expansion and contraction at cycling high temperatures and to provide insulating properties with respect to conductive heat transfer through the support block which could receive an insulating coating as a further thermal barrier between the support block and the graphite body.

The preferred embodiment will he described with respect to a high temperature graphite storage segment 4, however, the invention involves support of such a high temperature storage segment and/or the transfer of thermal energy to a working fluid. The temperature of the working fluid is then reduced to a temperature acceptable as power input for use by lower temperature external systems. Graphite is a preferred high temperature storage medium, however, other materials such as silicon carbide can be used. Therefore, the present invention is not limited to a graphite based thermal storage medium.

A working fluid inlet manifold 8 is located at one end of the graphite storage segment 4 and an outlet manifold 10 is provided at the opposite end of the graphite storage segment. The graphite storage segment 4 allows a working inert thermal transfer fluid to pass through the graphite storage segment and he collected at the outlet manifold 10 and directed to the mixing manifold 12. The mixing manifold 12 reduces the temperature of the working fluid to a temperature suitable for use as an input to conventional equipment or downstream equipment. This temperature may typically be in the range of 100° C. to 700° C. The working fluid, as it leaves the graphite storage segment, will be at a temperature typically above 1000° C. The graphite storage structure is theoretically capable of operating up to about 3000° C.

The high temperature thermal energy storage and transfer arrangement 2 also includes side plates 16 which close the sides of the graphite storage segment. Typically, the side plates 16, the mixing manifold 12, the outlet manifold 10 and the inlet manifold 8 are all of a ceramic material that can withstand the high and ultra-high temperature range of the graphite storage segment.

FIG. 1 includes the fluid distributing manifold 20 used to connect the thermal storage unit 2 to conventional downstream equipment. During circulation, after the heated working fluid leaves the mixing manifold 12, it will be at a lower temperature appropriate for conventional equipment and the requirement for ceramic or other high temperature materials is no longer required. Basically, the heated working fluid leaving the fluid distributing manifold 20 will preferably be in the order of 700° C. or lower, possibly much lower, during circulation. The actual temperature of the working fluid can be controlled by regulating the working fluid flows that pass through the distributing manifold 20. An advantage of the present arrangement, is the ability to maintain a relatively high temperature fluid (for example, in the order of 700° C.) over a long time period for powering downstream equipment without the need for any moving actuators or valves within the arrangement 2. As the temperature of the storage segment lowers, less mixing fluid will be required to maintain the higher output temperature. The distributing manifold 20 and the mixing manifold 12 cooperate to reduce the output fluid temperature provided to conventional downstream equipment. The controller 409 (shown in FIG. 15) cooperates with external variable speed blower 408 and flow valves 100a, 106a and 108a to provide this temperature control. The controller can optionally use deep learning algorithm techniques to optimize the startup and operating temperatures over the life of the graphite core to compensate for the ageing of system components and partial buildup of graphite dust and other contaminants on system components impacting flow and heat-transfer characteristics.

A number of electrical heating elements 30 are located in the graphite storage segment as shown in FIG. 1. Many heating elements can operate at temperatures up to about 2000° C. For higher temperatures more specialized heating elements are required. The ability to reduce and control the temperature of the fluid flow 70 leaving the mixing manifold 12 is an important aspect of the present application.

FIG. 1 discloses structural details of the support block 6 which includes two large cavities 6a and 6b that extend the length of the support block 6. Cavity 6b is an open cavity used to provide increased thermal resistance between the top surface 6f of the support block 6 and the base 6c thereof. The vertical walls of the support block 6 are relatively thin to provide a restricted thermal conduction path. The restricted thermal conductive path flow can also be achieved by providing holes through the vertical walls and thickening the walls, if necessary to provide the required structural strength. The top surface 6f of the support block 6 may often be at or near the temperature of the graphite body which either directly rests on this surface or separated from this surface by a coating of high strength insulating material. The base 6c of the support block may be in the order of about 60° C. or less. The passage 6a through the base 6 is again an insulating passage and functions in the manner of 6b. The support block 6 (due to the lower bottom temperature) can be supported using conventional materials and insulation.

Figure 2:
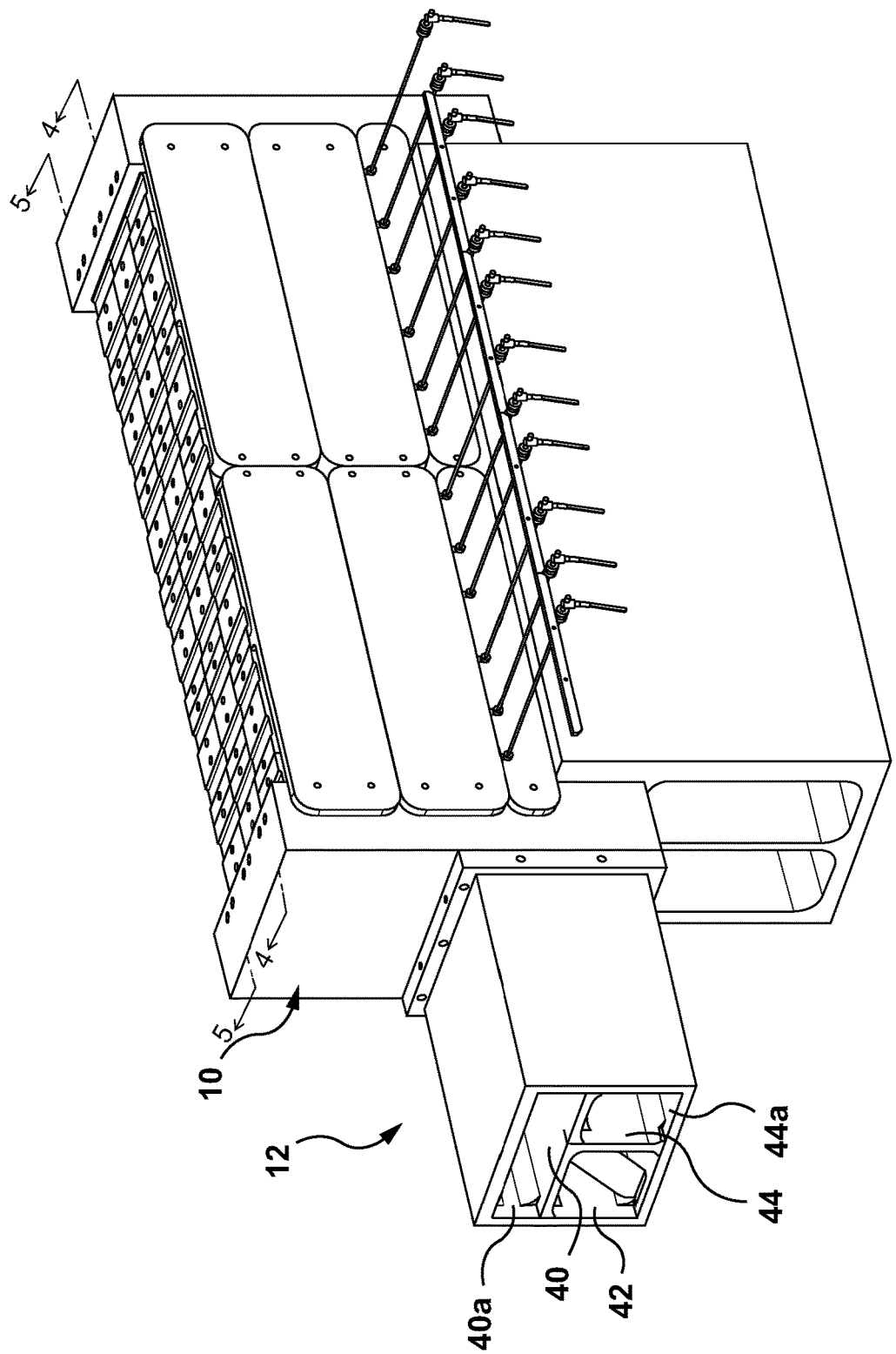
FIG. 2 is a view similar to FIG. 1 where the fluid distributing manifold provided at one end of the arrangement has been removed to show additional details of the mixing manifold.

FIG. 2 provides additional details of the fluid flow mixing manifold 12 that includes the cool mixing flow inlet passage 40 (having an inlet port 40a), hot fluid outlet passage 42 (having an inlet port 42a, see FIG. 5) and a working fluid inlet passage 44 (having an inlet port 44a). The mixing manifold 12 is of a high temperature material and preferably is of the same or similar ceramic material as the outlet manifold 10. The mixing manifold 12 cooperates with the outlet manifold 10 and the support block 6.

Figure 3:
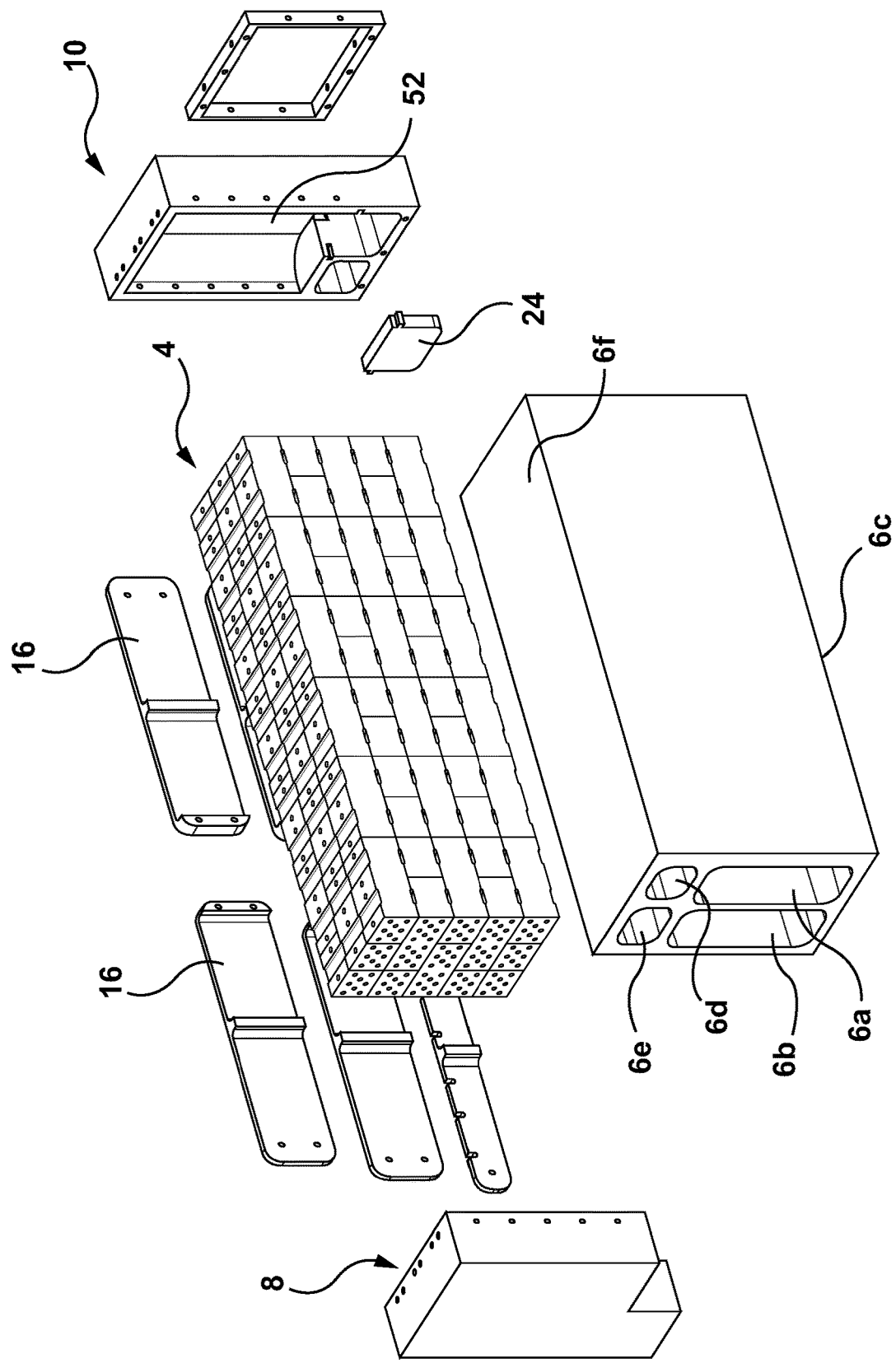
FIG. 3 is an exploded perspective view of the structure having a reverse orientation relative to FIG. 1.
Figure 4:
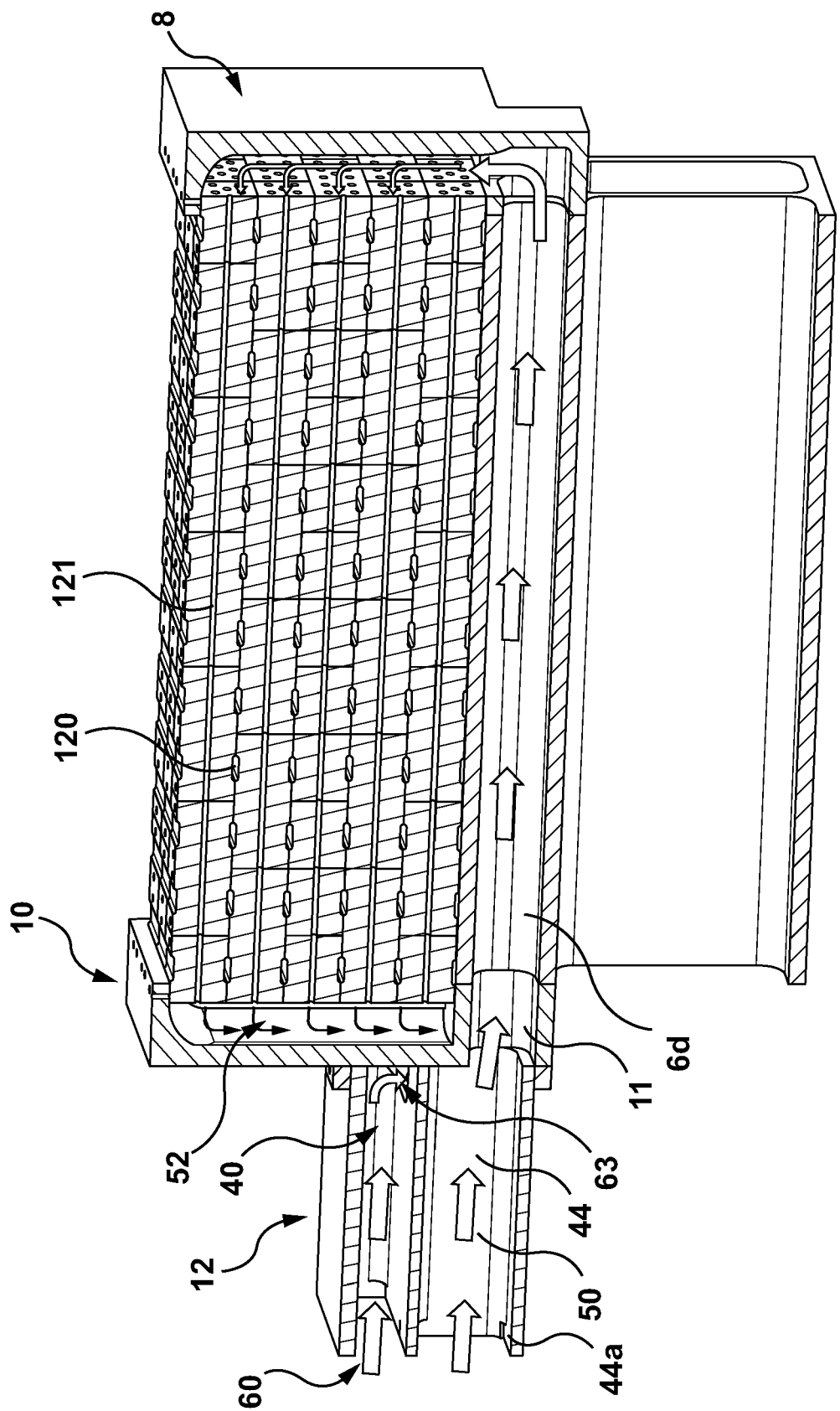
FIG. 4 is a partial sectional view taken along line 4-4 of FIG. 2 showing a number of different fluid flow paths associated with the storage and transfer arrangement.

Further details of the support block 6 are shown in FIG. 3 (reverse orientation). As can be seen, the support block 6 includes two upper passages 6d and 6e. Upper passage 6d is used for channeling the working fluid flow 50 to the inlet manifold 8 (FIG. 4). This initial flow of the working fluid through passage 6d provides cooling of the support block 6 and some initial heating of the working fluid. As will be further detailed below, in systems supporting larger graphite cores, support blocks 6 would be placed end to end and/or side by side depending on the desired dimensions of the core. Such larger systems would also optionally channel the working fluid flow 50 through all upper passages before entering the graphite body.

Exiting passage 6d, the working fluid flow 50 is then received in the inlet manifold 8 and channeled through a series of longitudinal passages 121 that extend through the graphite storage segment 4 before being discharged into the outlet manifold 10 (FIGS. 3, 4). In the preferred embodiment, only upper passage 6d is used for channeling the working fluid and to provide cooling. Passage 6e can also be used to channel the working fluid flow 50 and provide cooling. In the present embodiment one cooling passage is sufficient to pre-heat the working fluid flow 50 and to cool or lower the temperature of the base below these passages. Other configurations of these passages can be used and multiple passages through the base can be used as part of the cooling function.

The support block 6 cart be broken into a series of units along the length of the thermal storage segment. The thermal storage segment often will have a large temperature differential along its length and dividing the base into units reduces possible issues such as thermal shock, thermal stress and thermal expansion.

Figure 5:
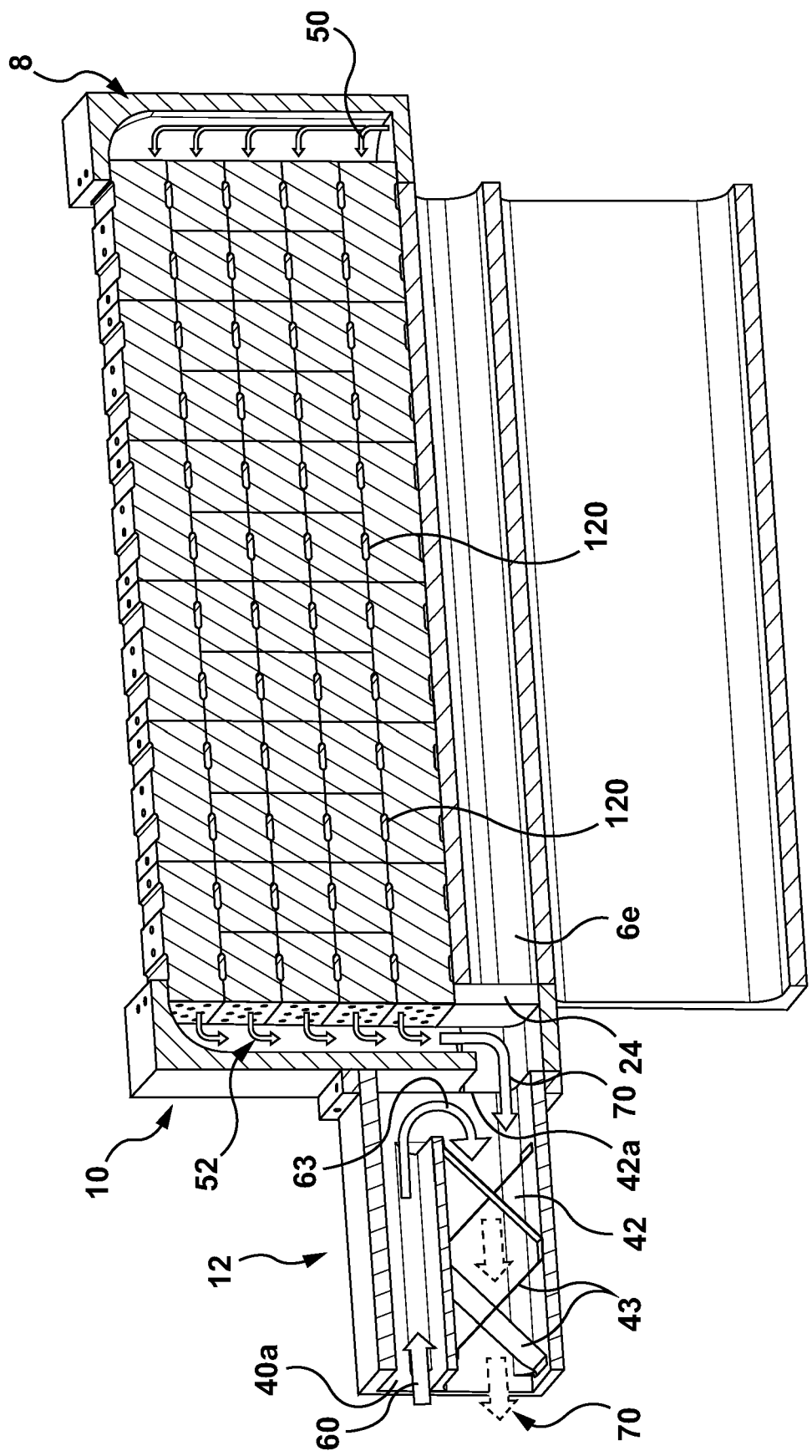
FIG. 5 is a partial perspective cutaway view taken along line 5-5 of FIG. 2 showing additional flows introduced in the mixing manifold.
Figure 8:
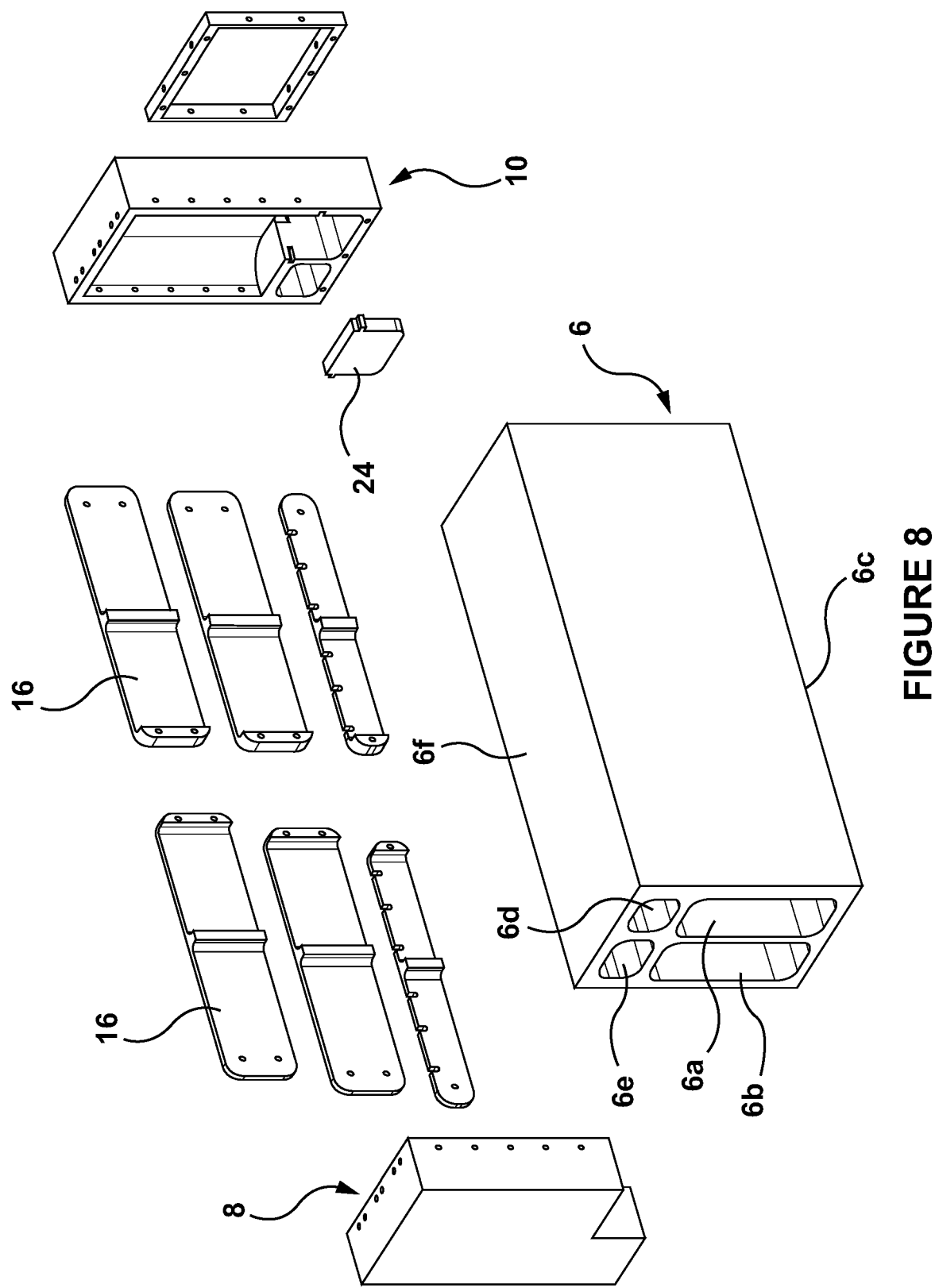
FIG. 8 is a further perspective view of the thermal energy storage transfer arrangement where the graphite storage segment is not shown.

FIGS. 3 and 8 show the closing plate 24 used to close the inner lower side of cavity 52 such that hot fluid 70 exiting the graphite storage segment 4 will be led to outlet passage 42 of the mixing manifold 12 (FIG. 5).

FIG. 4, FIG. 5 and FIGS. 5a through 5e illustrate the path of the working fluid flow 50 as it passes uninterrupted through the mixing manifold and through channel 6d in the graphite body support block structure 6 before being directed through the graphite storage segment 4. After passing through the graphite storage segment 4, the hot fluid flow 70 then re-enters the mixing manifold 12 where it merges with mixing fluid flow 60. The mixed hot fluid 70 is directed to the fluid distributing manifold 20 where cooling fluid flow 62 merges with the working fluid flow 70 before the fluid flow 70 exits the storage system as the thermal energy output fluid flow 70 which is directed to conventional equipment downstream of the fluid distributing manifold 20. The working fluid flow 50 initially is at a reduced temperature and provides cooling for the support block 6 and also cools a limited portion of the graphite storage segment directly above the support block. Working fluid flow 50 is provided to the inlet manifold 8 and is exposed to the end of the graphite storage segment 4. A series of passages 121 through the graphite storage segment 4 are provided such that working fluid flow 50 passes through the graphite storage arrangement and is discharged into the outlet cavity 52 of the manifold 10 as the hot fluid flow 70 as shown in FIGS. 4 and 5.

Figure 5A:
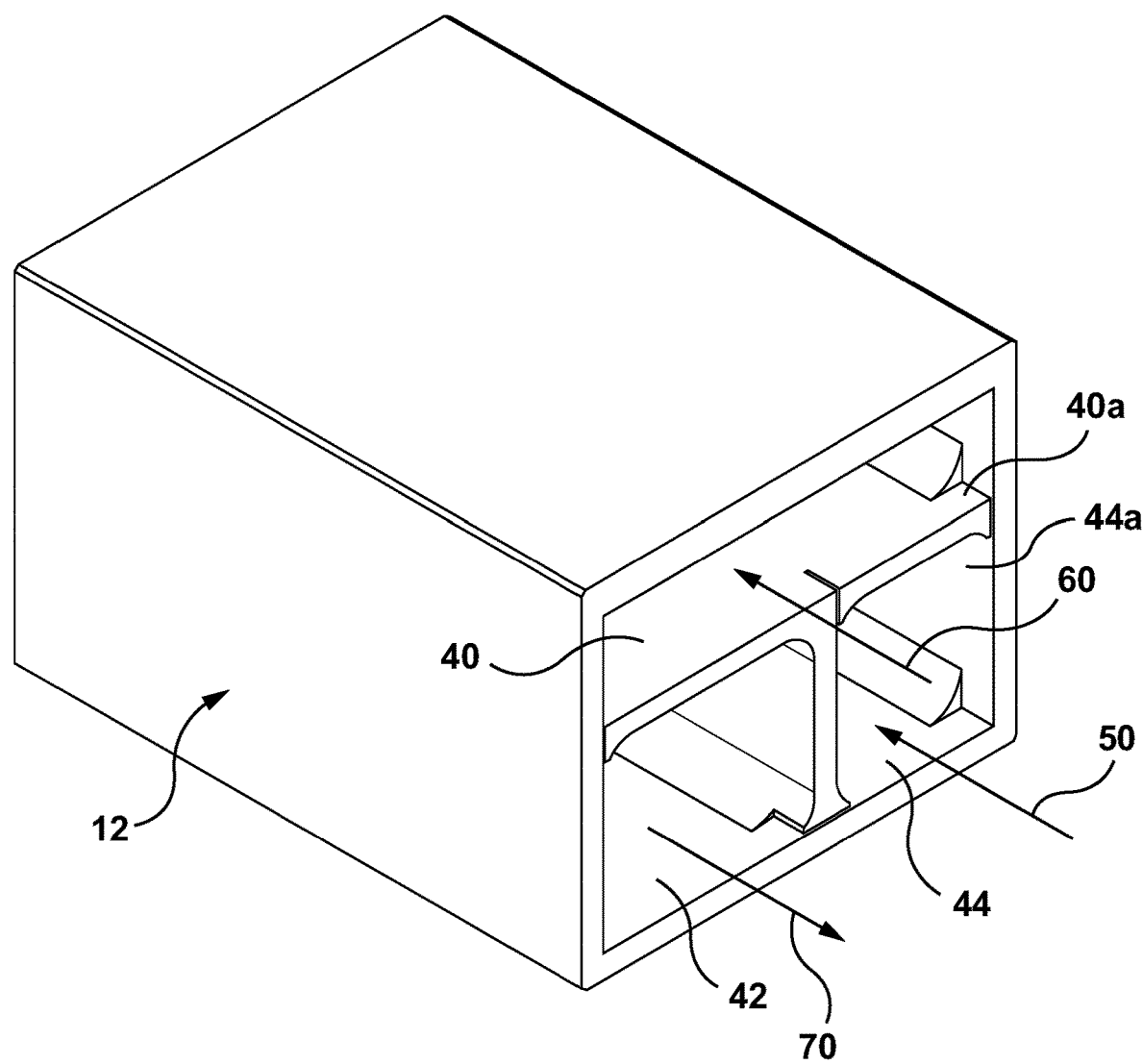
FIG. 5a is a perspective view of the mixing manifold showing the end of the mixing manifold that would be an abutment with the distribution manifold.

As described with respect to FIGS. 4 and 5, the end of the mixing manifold 12 shown in FIG. 5a abutting the fluid distribution manifold 20 is divided into three separate segments, namely, the mixing flow inlet passage 40, the thermal energy working fluid mixing chamber outlet passage 42 and the cool working fluid inlet passage 44 for incoming working fluid flow 50. Since both passages 40 and 44 contain incoming fluid during heat extraction from the graphite body, they help cool the structure of the mixing manifold 12—particularly the end of this manifold where these cooler fluids enter which is adjoining the fluid distribution manifold 20. An alternate design, whereby the thermal energy working fluid mixing passage 42 is central to the incoming working fluid and mixing fluids is anticipated and within the scope of this invention, but requires a more costly manufacturing process to deliver the more complex pathway layout.

Figure 5B:
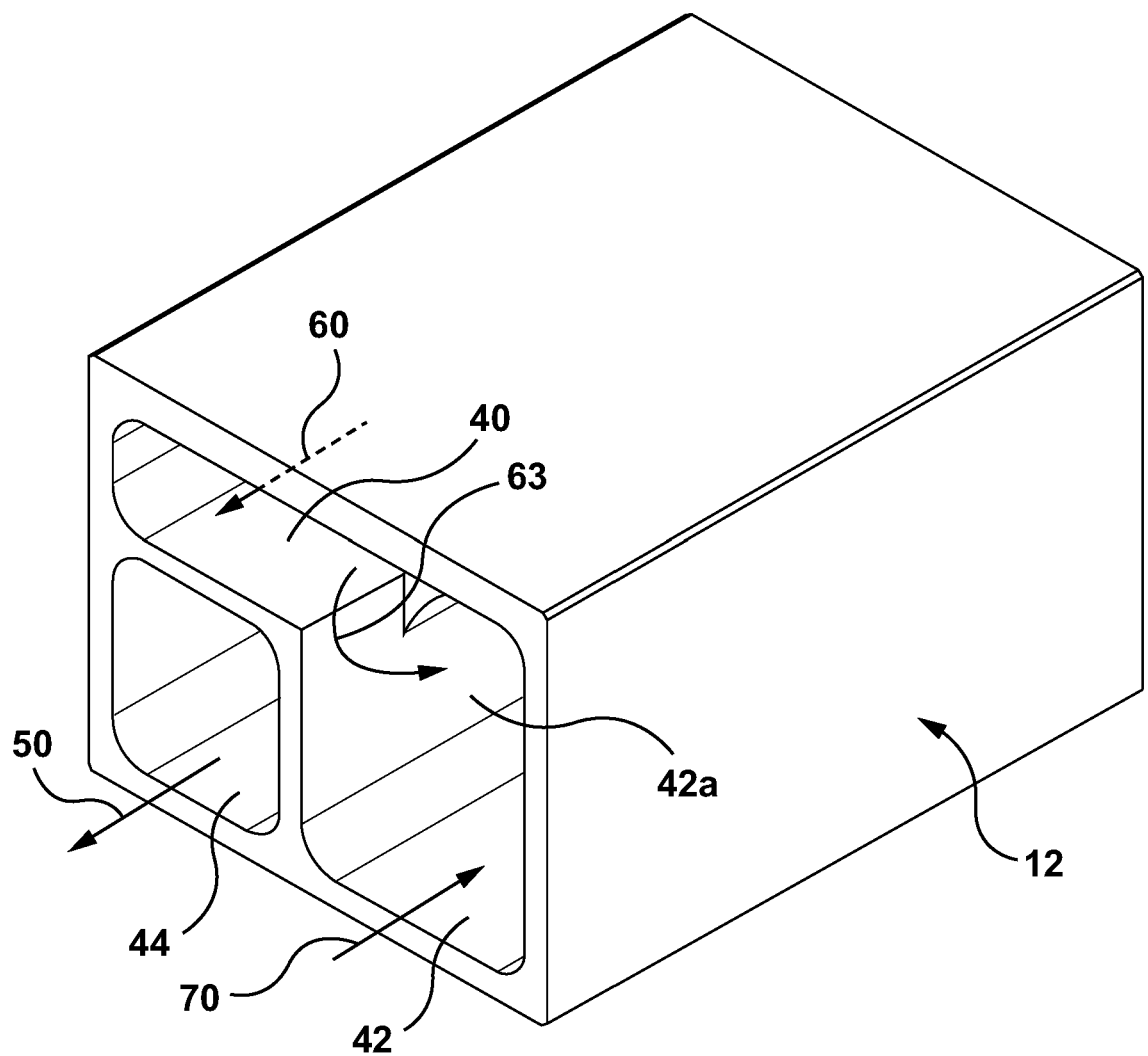
FIG. 5b is a perspective view of the mixing manifold showing the opposite end thereof that will be in contact with the output manifold.

As shown in the perspective view of FIG. 5b of the mixing manifold end abutting the manifolds 10 and 11, the mixing fluid passage 40 and thermal energy working fluid outlet passage 42 connect to one another allowing the cool mixing flow 60 to mix with the hot working fluid flow 50 being discharged from the graphite storage segment 4. The incoming working fluid passage 44 simply channels the incoming working fluid flow 50 through this mixing manifold while slightly cooling the outcoming working fluid through the adjoining wall. At the expense of increased circulating resistance, baffles could be installed within passage 44 and/or passage 40, optionally coated with insulating materials, to reduce radiated energy creeping backwards along these channels.

Figure 5C:
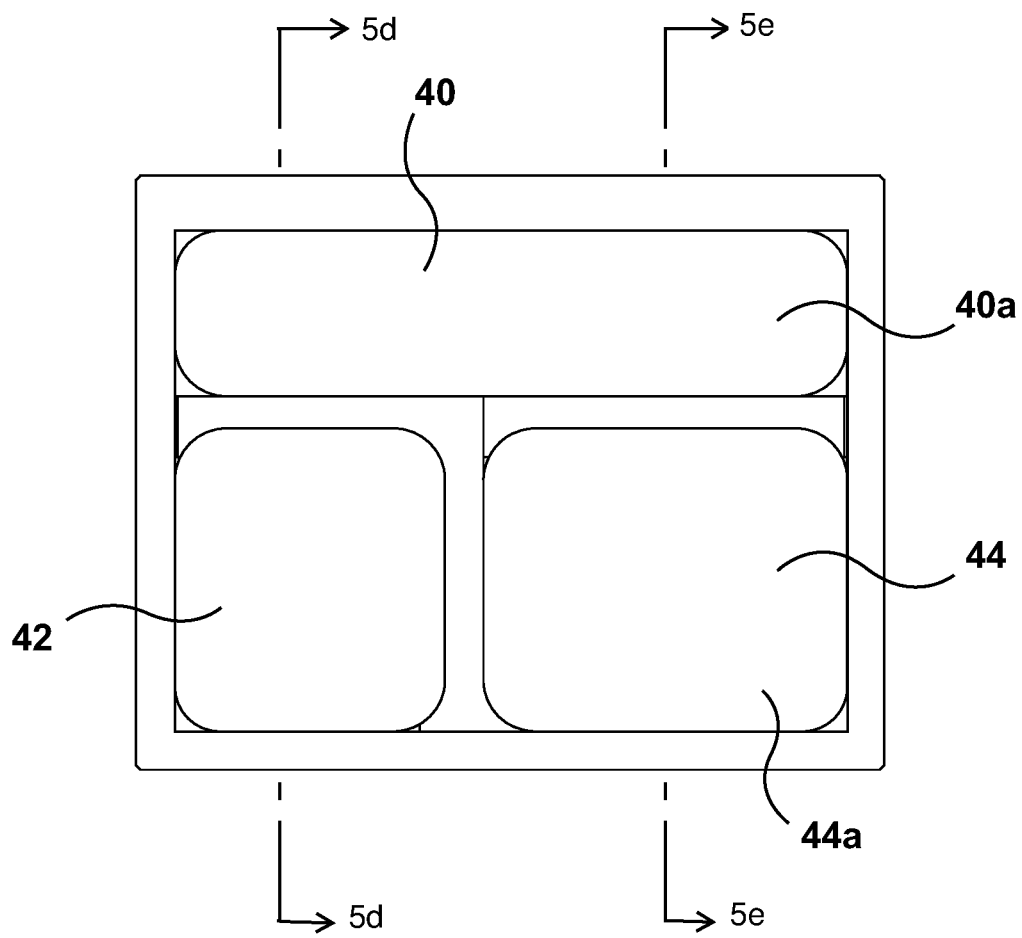
Figure 5D:
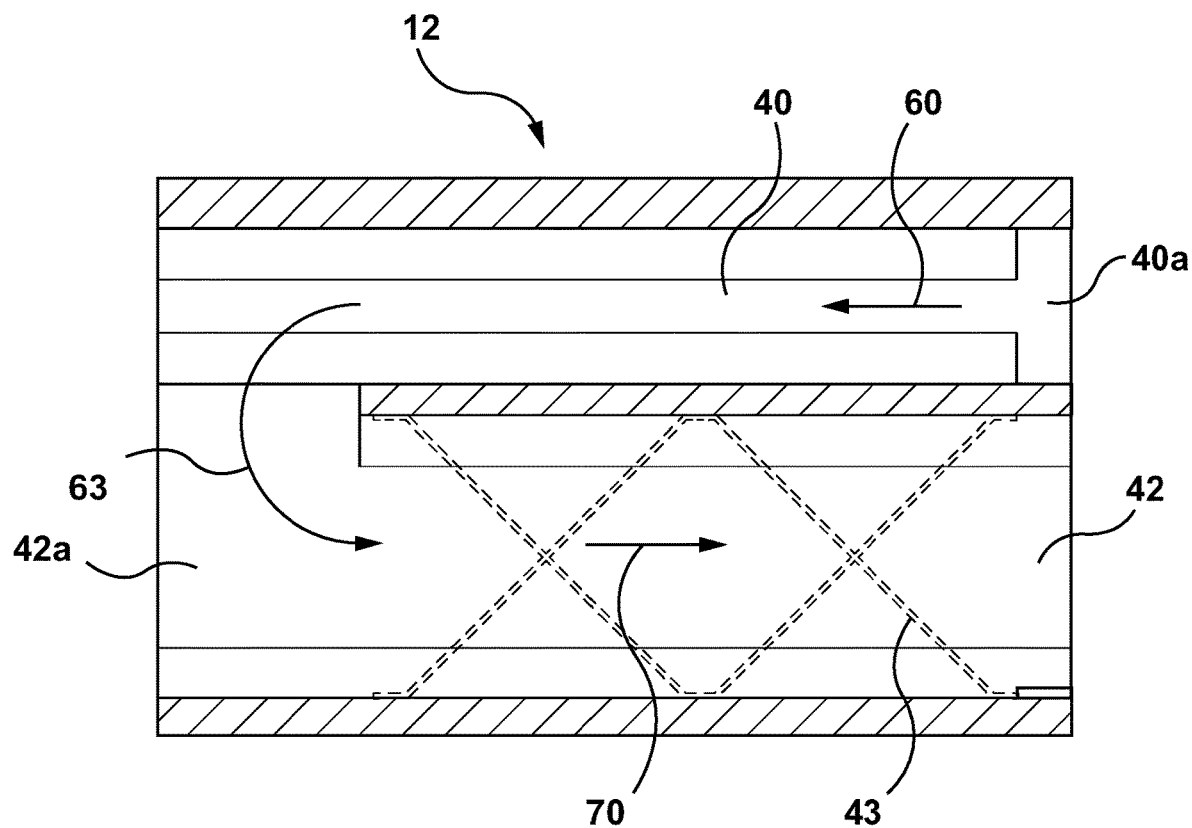
FIG. 5d is a cross-section of the mixing manifold taken along line 5d-5d of FIG. 5c.
Figure 5E:
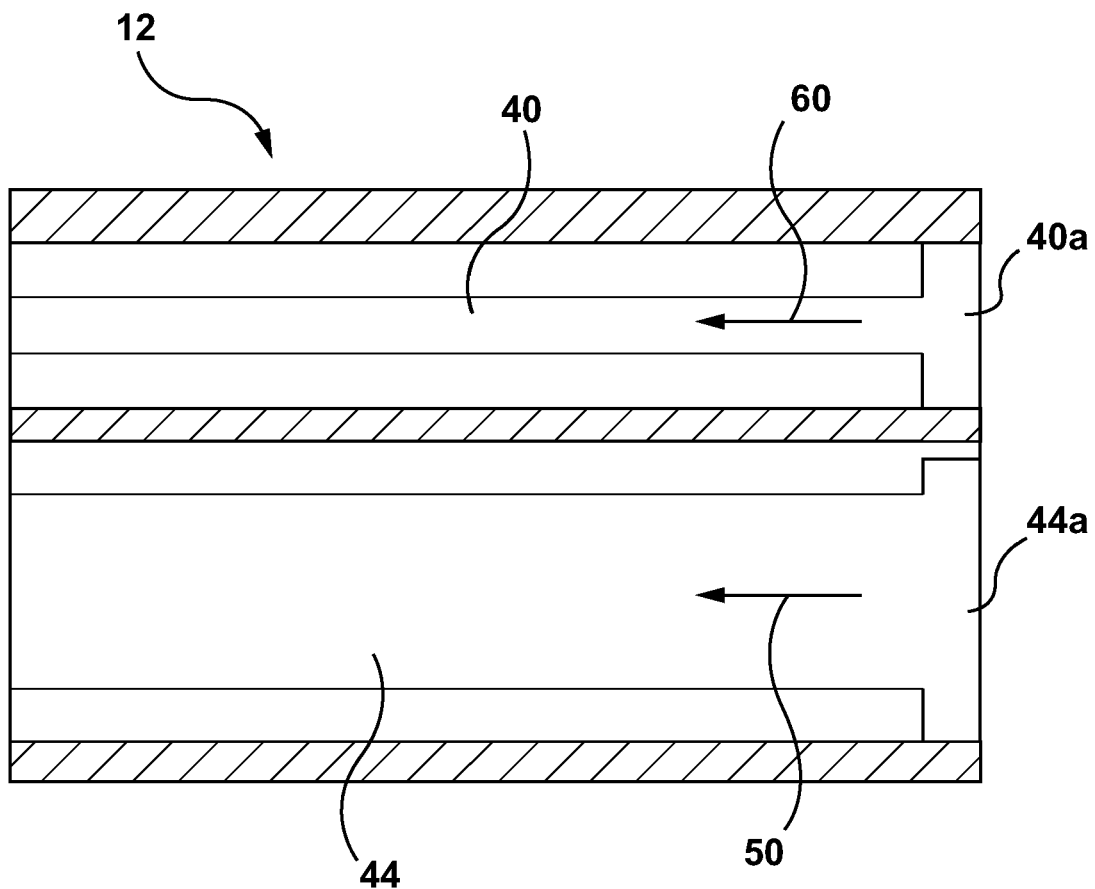
FIG. 5e is a sectional view take along the line cc shown in FIG. 5c.
Figure 6:
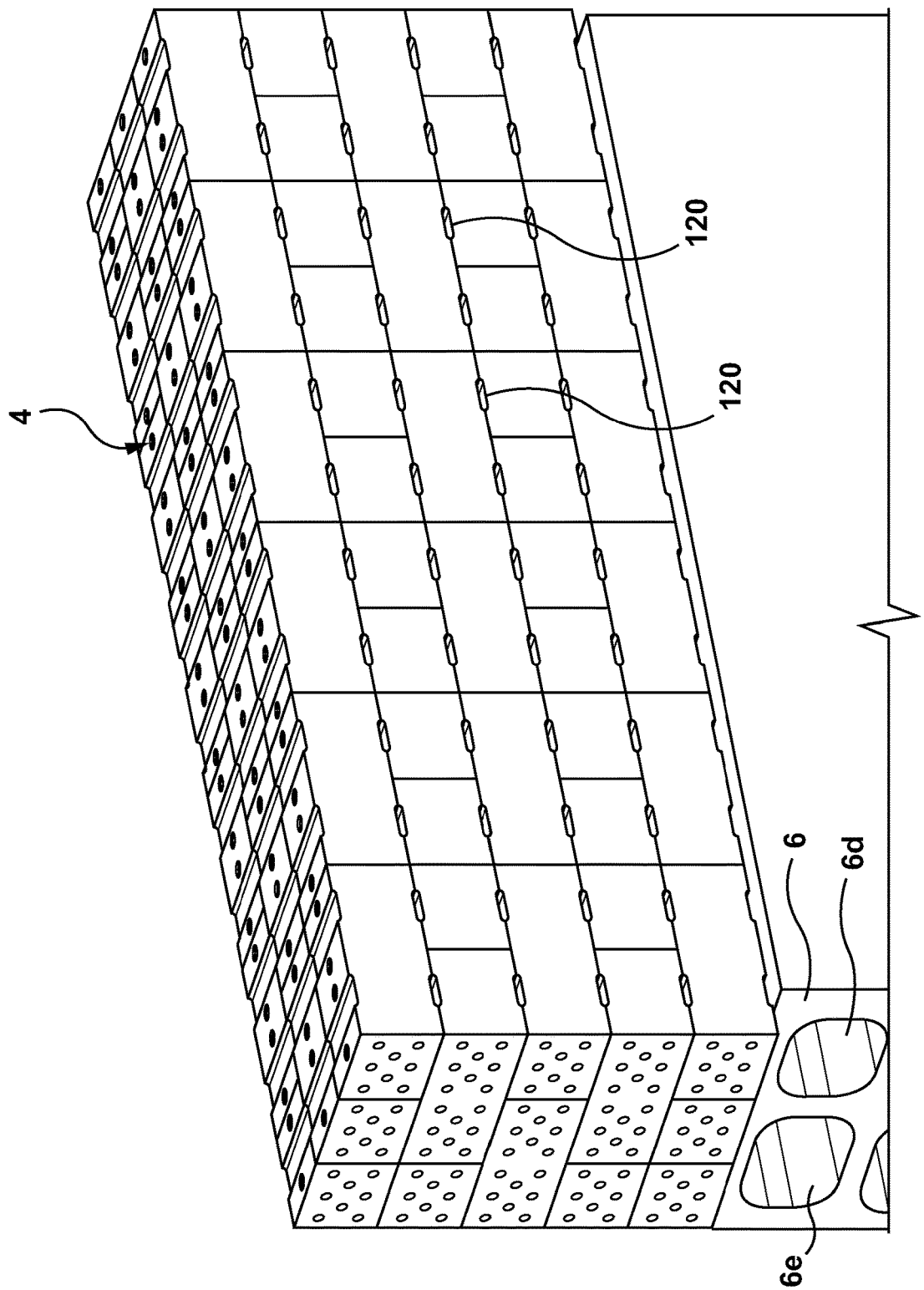
FIG. 6 is a partial perspective view of the graphite storage segment resting on a support block designed to reduce conductive heat loss through the support block.
Figure 7:
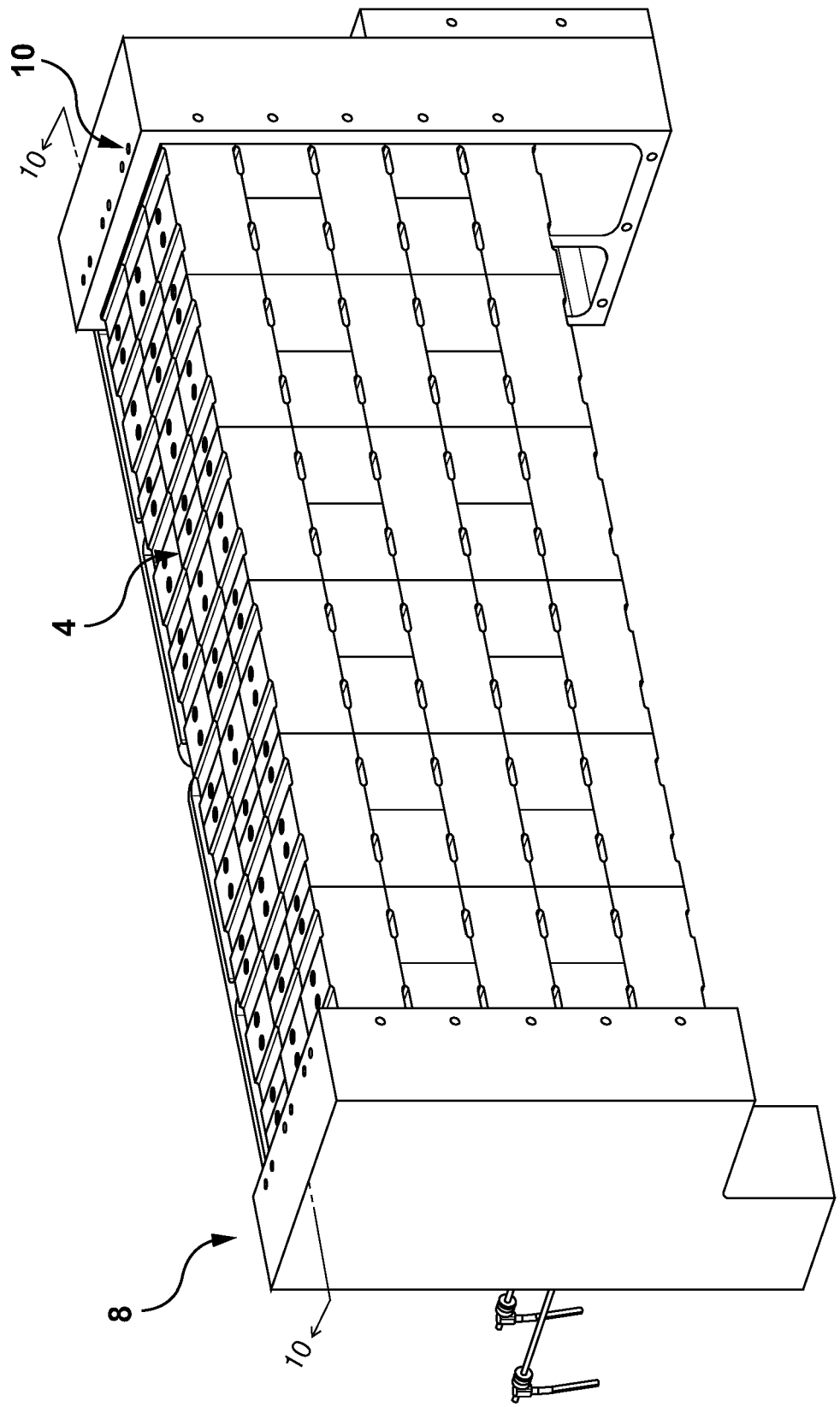
FIG. 7 is a partial perspective view (reverse orientation) showing some details of the inlet and outlet manifold associated with the graphite storage segment.

FIG. 5c illustrates the three separate passages and the location for sectional view D-D shown in FIG. 5d and E-E shown in FIG. 5e. Sectional view D-D in FIG. 5d, illustrates how the cool mixing fluid inlet passage 40 connects to the hot working fluid mixing passage 42, in which the mixing baffles 43 are illustrated in dashed lines for clarity of illustration. Sectional view EE in FIG. 5e illustrates how the working fluid inlet passage 44 is continued through the mixing manifold. As noted, these passages can be fitted with baffles to reduce radiated energy and, in the case of the mixing passage, ensure that the mixing fluid is thoroughly blended with the working fluid exiting the graphite body. A cost-effective approach to baffle design for lower flow rate systems is to manufacture these baffles from CFC (reinforced carbon-carbon) sheets which will create enough mixing and a few times radiation blocking and with minimum flow pressure drop. For higher flow rate and/or large systems, aerodynamic simulations substantiate the use of multiple horizontal beams of mixing fluid introduced perpendicular to the working fluid flow by boring elongated holes between passage 40 and 42 coupled with airfoil members inside the passage 42 duct creating turbulent flows (FIG. 5*d*), to produce the desired fully mixed working fluid exiting the mixing manifold while also blocking the radiation path.

As shown in FIG. 4, the mixing manifold 12 essentially abuts with an outer wall of the output manifold 10 and serves to connect the cavity 52 with hot fluid outlet passage 42 and connects working fluid flow 60 to passage od of the support block, In this way, the output manifold 10 is connected to parts of the mixing manifold 12 and also the working fluid passage 44 of the mixing manifold is connected to passage 6*d* of the support block. 6. A ceramic frame 13 acts as a partial seal and support between the mixing manifold and the output manifold.

The working fluid flow 50, after it passes through the graphite storage arrangement 4, is discharged into the cavity 52 of the outlet manifold 10 and the working fluid can be at a high temperature. For example, if the graphite storage segment is at a high temperature relative to output temperature demands, then, at start up, the working fluid in the outlet manifold 10 will be at considerably higher temperature than desired. Typically, the temperature of the working fluid will be generally equal to the temperature of the graphite storage segment adjacent the outlet manifold. This high temperature in a standby mode will also heat the mixing manifold.

The ability to store and concentrate thermal energy in the graphite storage segment is directly related to the amount of graphite. The ability to remove heat energy from the graphite storage segment is a function of the flow rate and the size of the passages 121. It is often desirable to provide more graphite and less passages to increase the thermal storage capacity. If more graphite is provided, the temperature of the working fluid as it leaves the thermal storage segment will be at the approximate temperature of the thermal storage segment.

Figure 16A:
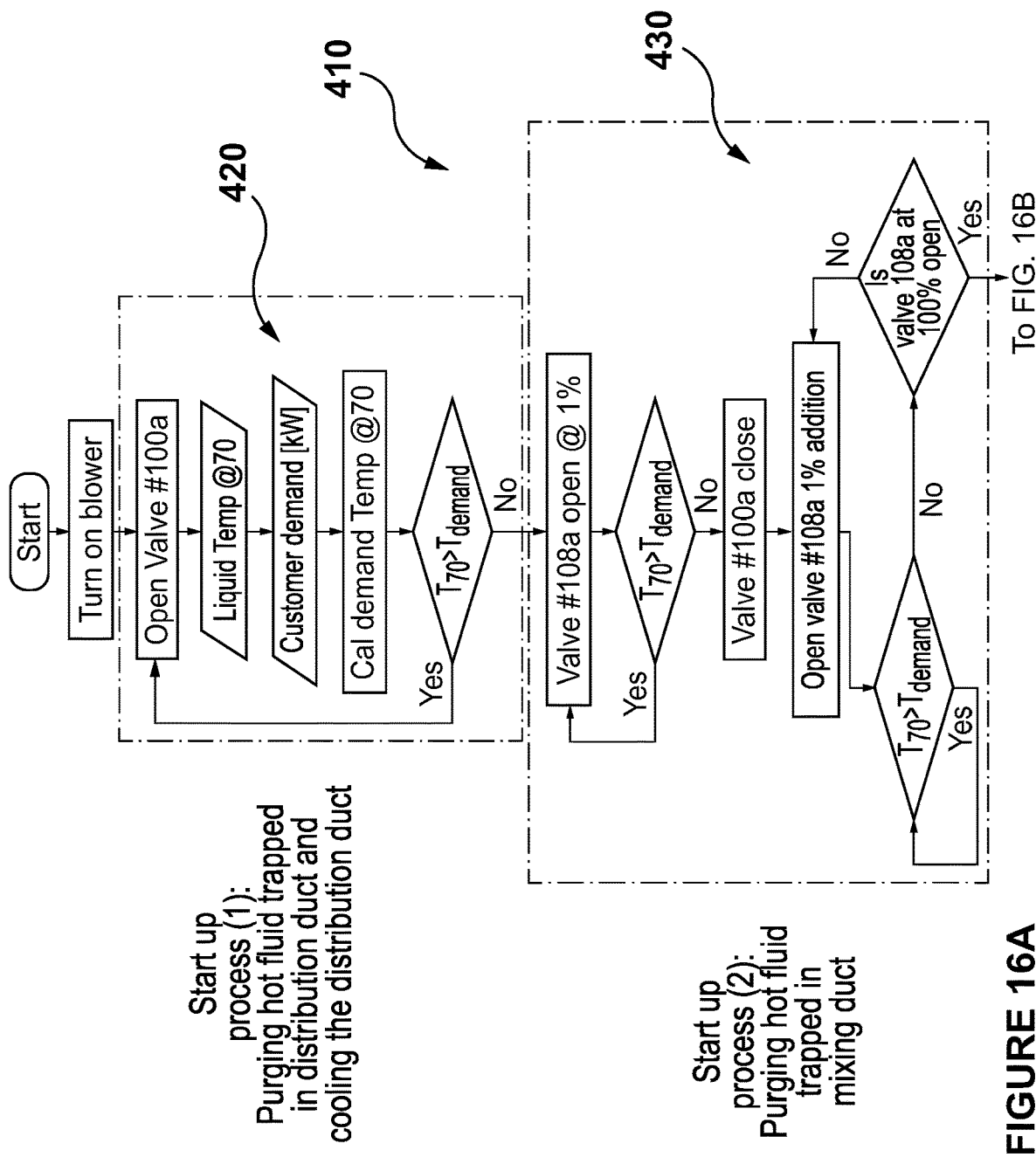
FIGS. 16A and 16B are a control logic diagrams.
Figure 16B:
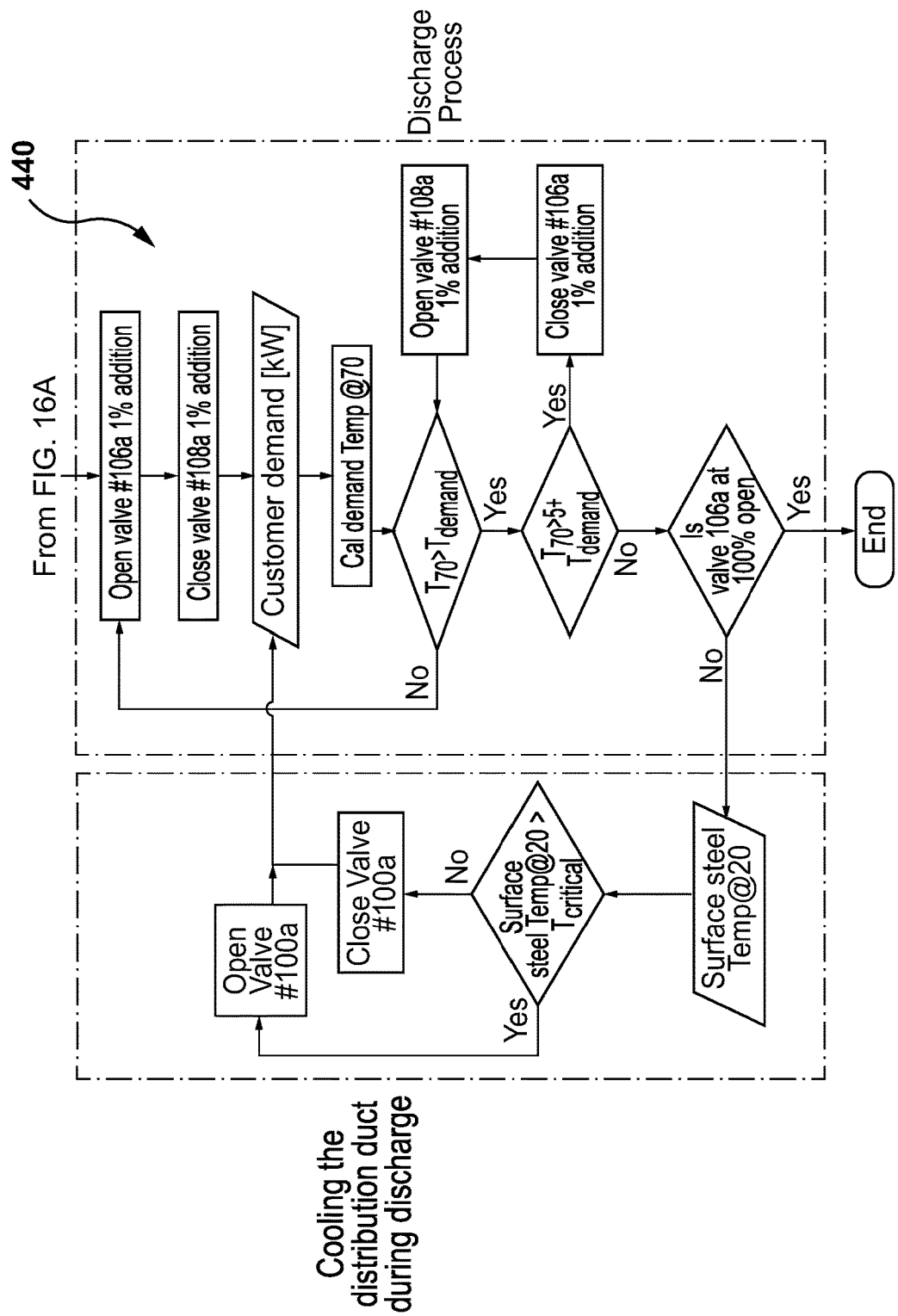

If demand for the working fluid flow 50 is increased when the graphite storage segment is at its upper temperature, the temperature of the outlet flow will remain unchanged for some time and often hours or days as the system dynamically adjusts the mixing and cooling flows. Conventional equipment used to receive a hot inert working fluid as its input source cannot typically accept the working fluid flow at temperatures above about 800° C. without special coatings. To reduce the temperature in an efficient manner and manage the output temperature, a cooling fluid mixing flow 60 is introduced into the mixing manifold 12 and mixes with the thermal energy output fluid flow 70 below arrow 63 (FIG. 5). The variable mixing flow 60 can be provided in sufficient quantities and at a sufficient rate to reduce the resulting temperature of the output working fluid flow 70. For some applications, the resulting thermal energy output fluid flow 70 may be at a temperature of 400° C. The desired temperature can preferably be set by the user. FIGS. 16A and 16B provide a simplified control logic diagram for providing an output temperature as required to efficiently power downstream equipment.

Figure 15:
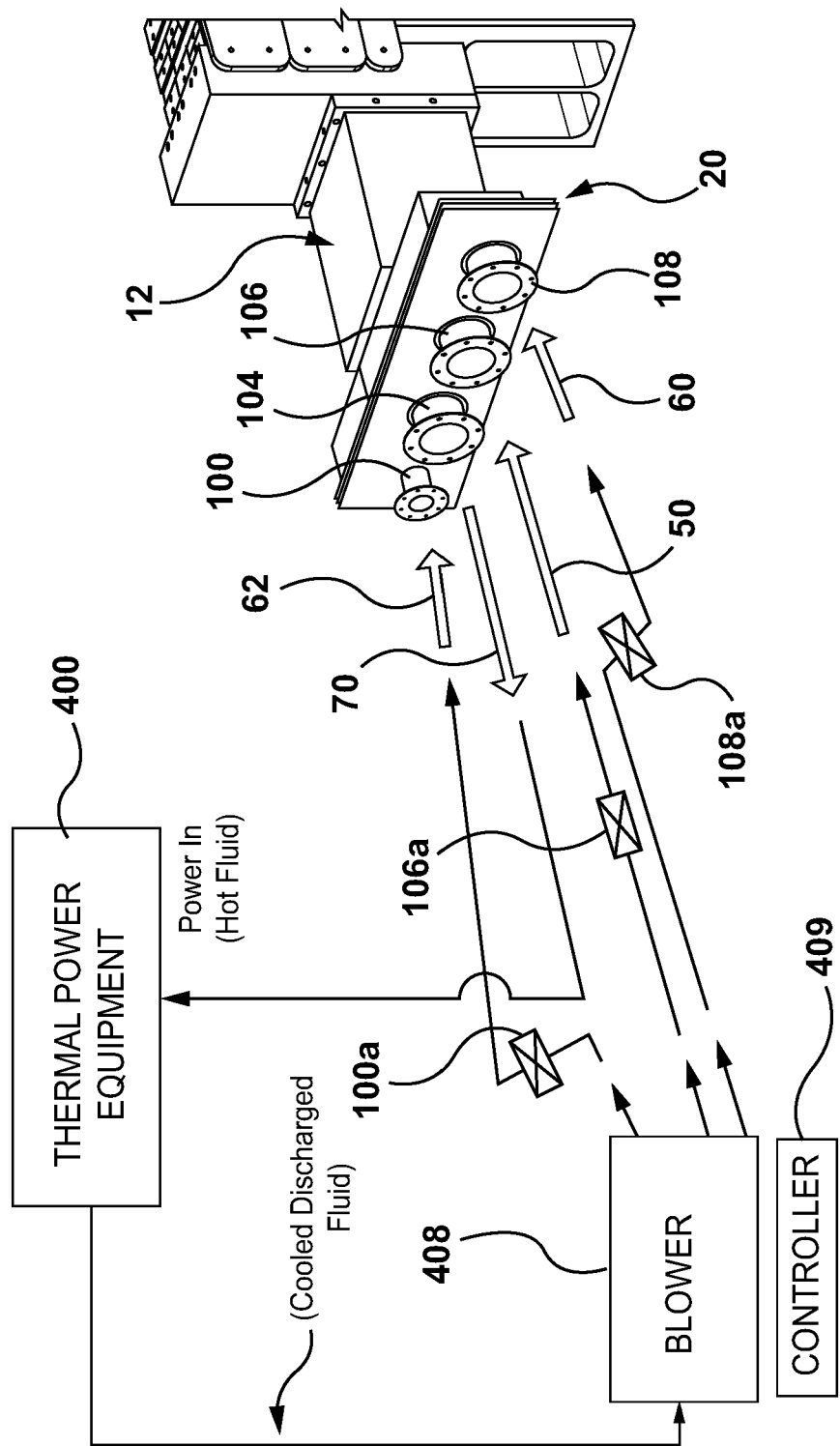
FIG. 15 is a schematic of the thermal energy storage and transfer arrangement in association with downstream equipment.

After having traversed the graphite body, the working fluid flow 50 enters into the output manifold 10 which diverts it into passage 42 where it is combined with the mixing fluid flow 60 (FIG. 5). Passage 42 preferably includes a number of baffles to encourage the mixing of the fluid to reduce the temperature and temperature variations. The baffles also block radiant energy flow from the graphite body to the outlet manifold. The mixing manifold 12 reduces the temperature of the exiting thermal energy output fluid 70 based on the relative proportion of flows 50 and 60 (FIGS. 4, 5) such that after further combination with cooling flow 62 (FIG. 15) (if any), conventional equipment can then efficiently receive this working fluid flow 70 as an energy input for downstream processing. The mixing baffles 43 are placed to collectively block line of sight radiation from the output manifold 10 to the distributing manifold 20 (FIGS. 5 and 15).

The effective operation of the graphite storage segment at high temperatures, requires control of the thermal energy transfer working fluid particularly during start-up of the system to protect downstream equipment. In this situation, the initial thermal energy working fluid flow 50 will push the previously stationary working fluid from the graphite body which will enter the mixing manifold 12 initially at maximum temperature. The fluid distributing manifold 20 acts as a further barrier component protecting downstream conventional lower temperature components. To overcome potential problems and to protect the fluid distributing manifold 20 face plate from excessive temperatures, the fluid distributing manifold 20 includes an inlet 100 for receiving a cooling flow 62 that passes through the fluid distributing manifold, cooling the manifold before being discharged into the working fluid flow shortly before it leaves the system.

Details of the fluid distributing manifold 20 are shown in FIGS. 11 through 14. The fluid distributing manifold 20, as shown in FIG. 15, forms an interface between the high temperature storage equipment on one side of the distributing manifold and the lower temperature conventional equipment 400 connected to the outside of this manifold. The manifold 20 includes a faceplate 202 which can be made with high temperature steel and extends through the wall of an associated containment vessel, typically also made of steel or concrete which surrounds the thermal storage system. The exterior of this faceplate will typically be exposed to unconditioned air at ambient temperatures (although the vessel may be buried or surrounded by water) and includes four ports in the faceplate for receiving the piping associated with the pipes 100, 104, 106 and 108 shown in FIG. 1. In operation, the faceplate 202 will be at a relatively low temperature in the order of 60° C. or lower depending on ambient temperatures.

Immediately below the faceplate 202, in the gap between the faceplate 202 and an intermediary plate 204 (FIG. 11), is one or more high temperature insulation layers or coatings on faceplate 202 and intermediary plate 204 to effectively protect the face plate 202. An inner plate 206 is spaced below the intermediary plate 204 and this plate essentially forms a series of distribution channels along the surface thereof used to cool the distributing manifold and, in particular, cool intermediary plate 204 to assure that the faceplate 202 can be maintained at a safe temperature. A series of flows are shown as 50, 60, 70 and 62 in FIG. 11 and correspond to those shown in FIG. 1. The fluid distributing manifold 20 will distribute the cooling flow 62 and will also control the mixing flow 60. These flows are controlled by selectively opening and closing valves 100*a*, 106*a* and 108*a*, and activating blower 408 (FIG. 15).

Figure 12:
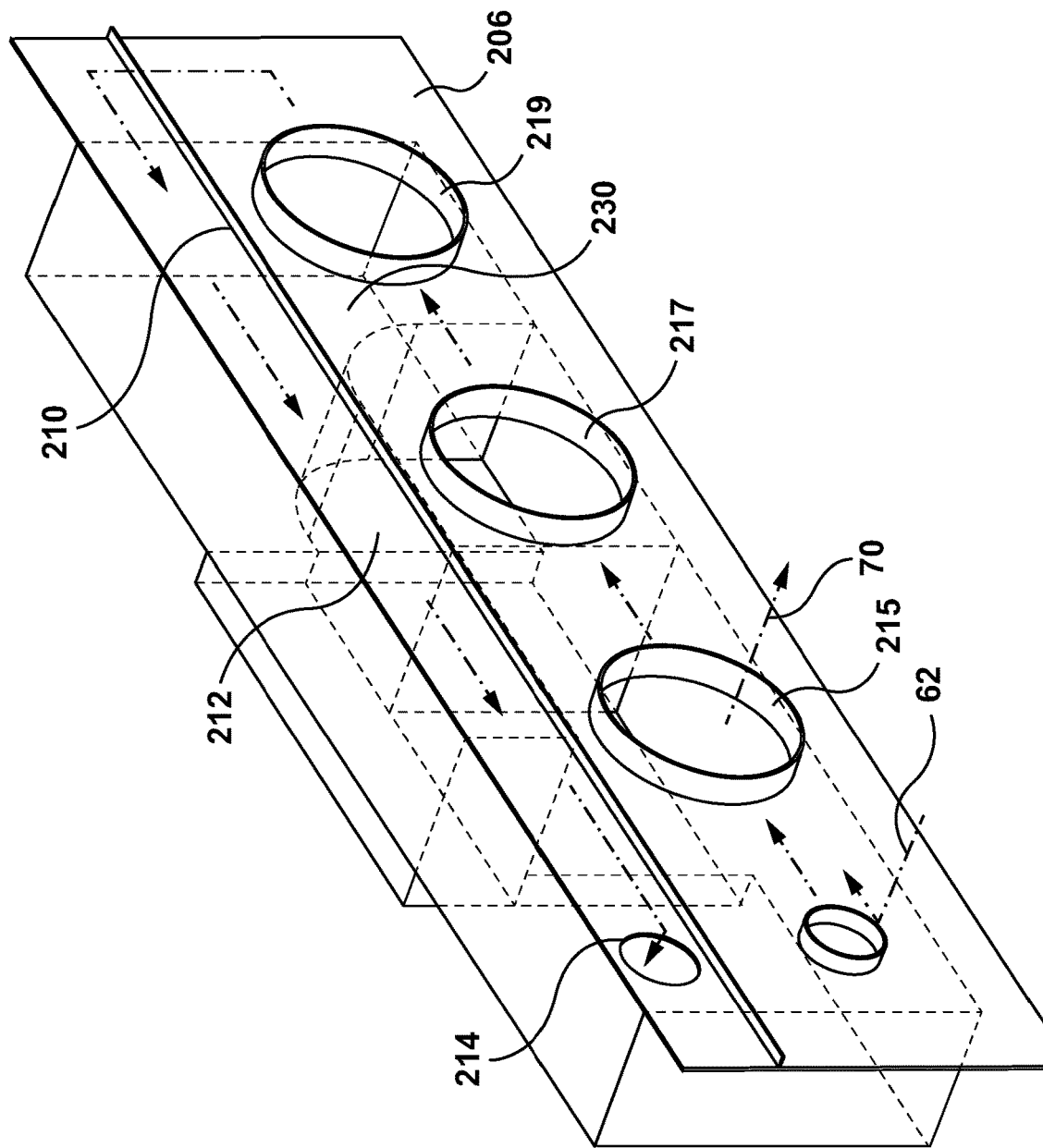
FIG. 12 is a perspective view of the distributing manifold with the front plate removed.
Figure 13:
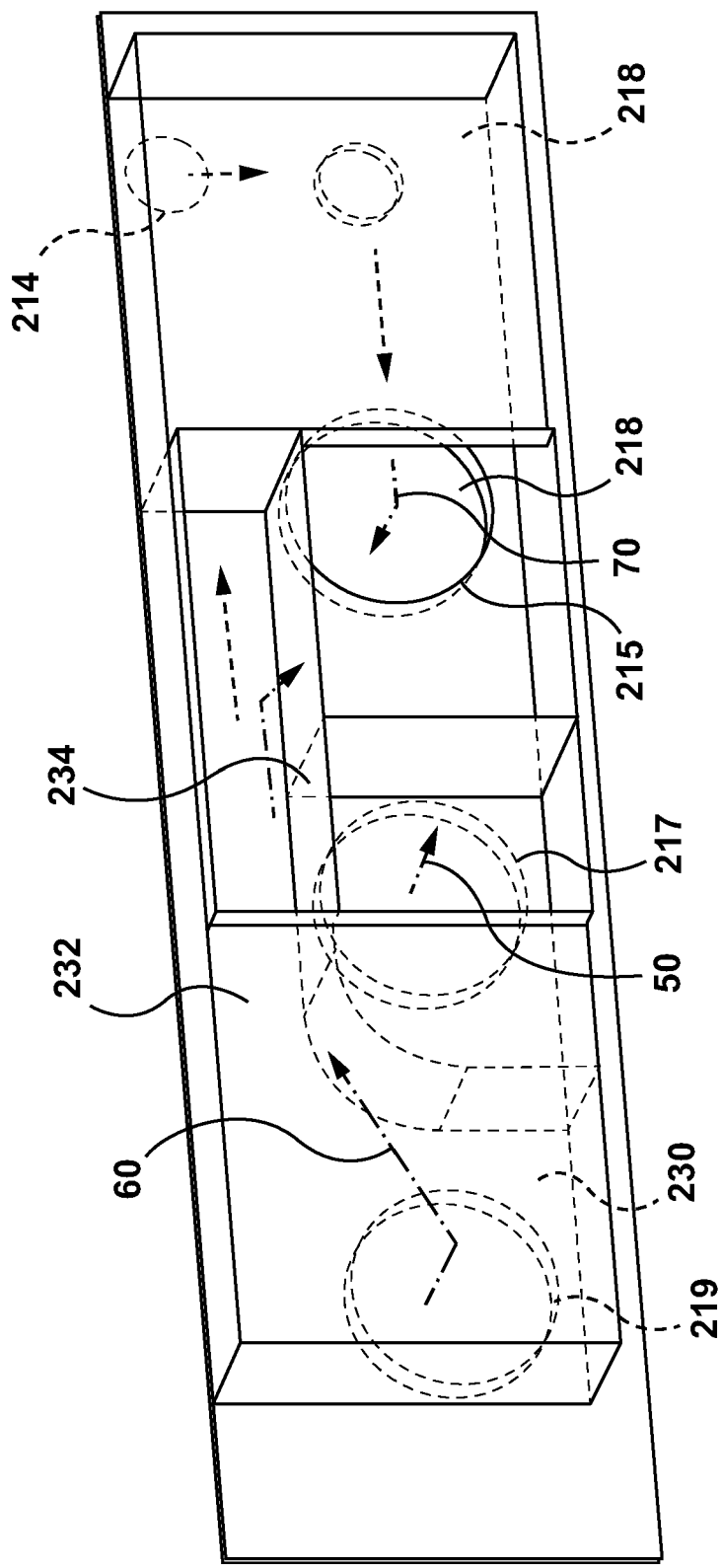
FIG. 13 is a rear perspective view of the distributing manifold with some back covers removed.
Figure 14:
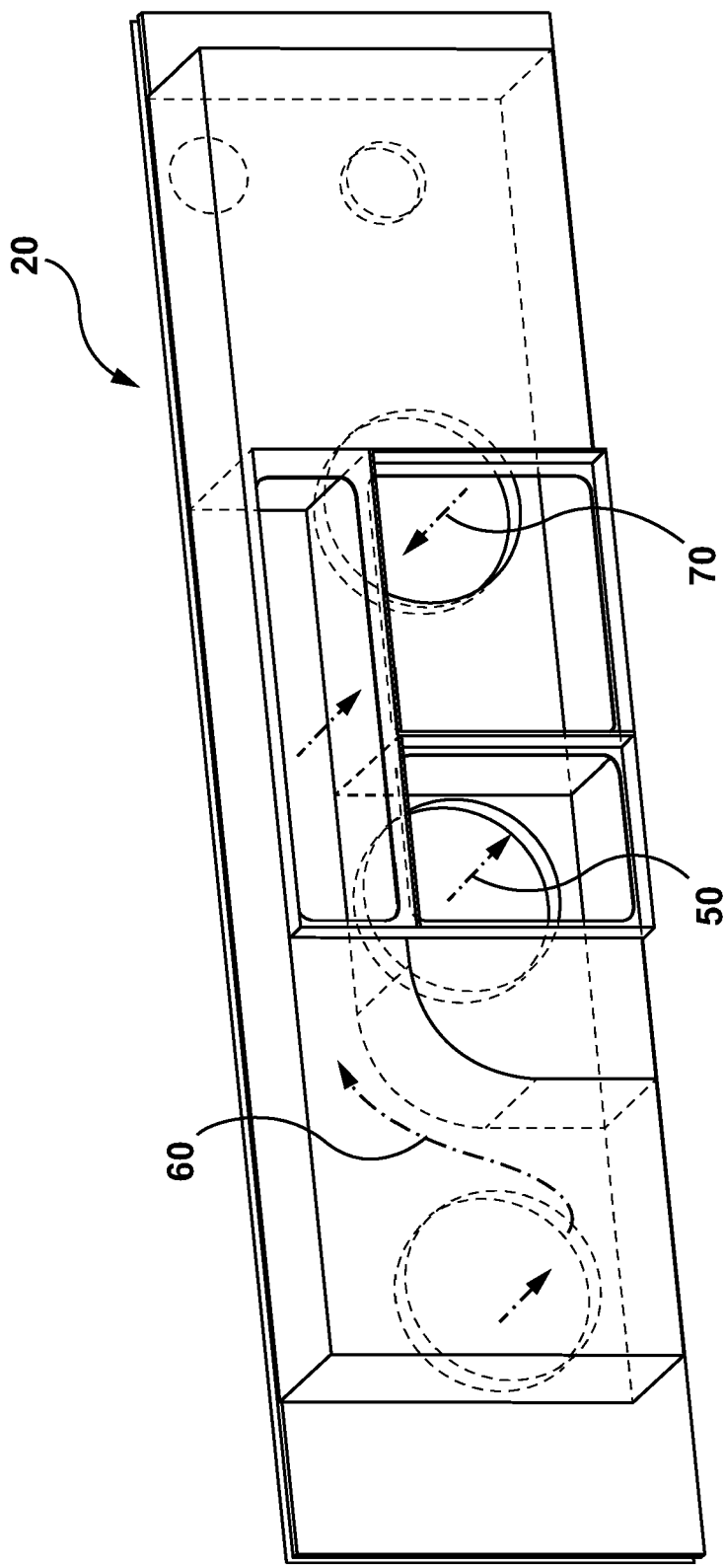
FIG. 14 is a rear perspective view similar to FIG. 3 with the hack covers in place.

In FIG. 12, the faceplate 202 and the intermediary plate 204 are not shown to assist in understanding how the cooling flow 62 passes through the fluid distributing manifold 20. Gas flow 62 is introduced to the fluid distributing manifold at the inlet pipe 100 which opens into the layer between the inner plate 206 and the intermediate plate 204. As indicated, the fluid flow 62 is introduced at one end of the distributing manifold and flows between the inner plate 206 and the intermediary plate 204, and around pipe sleeves 215, 217 and 219. The longitudinal baffle member 210 restricts the flow to one side thereof before the flow reverses direction at the opposite end of the intermediate plate 204. The fluid then passes through the outer channel 212 and exits through the exhaust port 214. The exhaust port 214, as shown in FIGS. 13 and 14, is connected to the chamber 216 and the cooling fluid then exits through the exhaust port 218 in the adjoining chamber to merge with the outbound working fluid 70. It is important to note that although this cooling flow 62 is illustrated going around baffle member 210, many similar baffles could direct this cooling flow 62 around a larger area as necessary to cool any external containment vessel components.

When the thermal energy storage system is in stand-by without any fluid flow, the graphite storage segment can be at a high temperature and the faceplate 202 of the fluid distributing manifold 20 is at a low temperature. Over time, the temperature of the components between the graphite storage segment and the outer ambient temperature will rise. In order to maintain the temperature of the fluid distributing manifold at a safe temperature, both the manifold itself and faceplate 202 are cooled by cooling fluid flow 62 which will require periodic startup of the circulating blower or a steady low speed operation. Assuming one blower is connected to all fluid inputs (as opposed to an alternate of separate variable speed blowers and black-flow valves which would achieve the same result), adjustment of variable valve 100a (FIG. 15) is necessary to be coordinated by the controller in conjunction with blower speed, to control the volume of the fluid flow to achieve the desired cooling. In contrast to the mixing manifold which must be constructed of a ceramic or other material capable of withstanding extreme temperatures, the fluid distributing manifold requires its own cooling to maintain the exterior temperature thereof within a much lower safe operating range assuming that exterior components are contracted constructed of high-temperature steel or similar materials in the different modes of the thermal storage system. The different modes are shown in FIGS. 16A and 16B.

Even if the fluid distributing manifold is maintained at a safe temperature in a standby state of the storage system, startup of the storage system could cause damage to the distributing manifold as well as downstream equipment, At the beginning of the discharge process, the ultra-high temperature (typically greater than 1000° C.) working fluid that has been trapped in the mixing manifold needs to be cooled. The cooling flow 62 critically maintains the fluid distributing manifold at a safe temperature during standby, and provides cooling during initial startup.

A second stage of the startup arrangement reduces the temperature of the mixing manifold such that any hot fluid contained therein will not damage the distributing manifold or external equipment. This is accomplished in combination with cooling flow 62, by introducing the mixing fluid flow 60 through the last port 108 in the fluid distributing manifold as shown. This mixing fluid flow volume is varied by adjusting valve 108a and varying the blower. It passes through the face plate 202 and the intermediary plate 204 and into its own chamber 230. The flow 60 is then redirected through the fluid distributing manifold along the passage 232 and will pass out of the rectangular port 234 and will mix with the fluid contained within the mixing manifold and the combined fluid will leave through the exhaust port 218. During this phase, the cooling flow 62 preferably continues to run to protect the outer portions of the fluid distributing manifold and lower the temperature of the initial working fluid being pushed out of the mixing chamber by the mixing gas.

As the ceramic mixing manifold's temperature drops, the working fluid flow 50 is introduced to the graphite storage segment by varying valve 106a and the blower speed. It flows through the fluid distributing manifold into channel 44 through the mixing manifold before heading through the graphite support structure and then through the graphite body itself. This will be a relatively low volume flow initially as the working fluid flow 50 being discharged from the graphite storage segment will be at the temperature of the graphite storage segment, By controlling the mixing flow 60 through the distributing manifold and into the mixing chamber where it merges with the working fluid 50 exiting the graphite body, it is possible to precisely control the temperature of the output fluid flow 70 as it leaves the distributing manifold.

The fluid distributing manifold 20 provides an effective arrangement for allowing an operator or system to complete a number of startup steps to transition from a standby state to an operating state that effectively removes heat from the graphite storage segment. The system design achieves this without the need for valves or other moving parts or temperature sensors within the containment vessel.

The various flows are varied by adjusting the speed of blower 408 in conjunction with control valves 100a, 106a and 108a located downstream of the thermal power equipment or heat exchanger. Alternatively, a series of separate variable speed blowers equipped with backflow check flaps connected from such power equipment to each of the input ports of the distributing manifold can also achieve the desired adjustable flow rates.

FIG. 14 shows the rear surface of the fluid distributing manifold 20 and plates have been provided to redirect the mixing flow as shown and to effectively close the chamber 216 on the rear surface of the fluid distributing manifold. The fluid flows to and from the mixing manifold are centrally located on the distributing manifold 20.

The cooling flow 62 (FIG. 15) may be selectively activated or continue to pass through the inlet 100 when the device is shut down just to maintain the fluid distributing manifold 20 below an upper temperature limit. This cooling flow can be provided as necessary when the graphite storage segment is in a storage or standby state. Control logic block 420, as shown in FIG. 16A, provides an example of this function.

The fluid distributing manifold 20 allows downstream equipment to be of a conventional lower temperature. The outlet 104 (FIG. 15) receives the heat transfer output fluid flow 70. This is the output fluid flow that is provided as an input to conventional equipment 400 for power generation, direct heat applications or other applications. The temperature of the fluid flow is typically below a maximum of about 700° C. to 800° C. and commonly between 300° C. and 500° C. The output temperature can be set by the user and is particularly advantageous for efficient operation of some downstream equipment. Until the energy in the graphite body is depleted below the desired output temperature, the actual temperature will not be influenced by the temperature of the graphite storage segment 4, as the controller is able to adjust valves and blower rates based on the temperature of the returning working fluid (after downstream equipment has utilized the thermal energy) and the desired temperature and flow rate of the working fluid. Control logic block 440 can be used to regulate the output flow 70 to have a desired temperature range $T_{demand}$ and working fluid flow as set by the user.

The port connection 106 receives the work fluid flow 50. The rate of this fluid flow 50 is determined by variable speed blower 408 and valve 106a (FIG. 15). Various temperature sensors and controls can be used to maintain a desired output temperature of the flow 70. The connection 108 accommodates the mixing fluid flow 60.

The control of the various inputs to the graphite storage segment and mixing manifold allow the output flow 70 to be efficiently utilized by the downstream equipment.

During standby or initial start-up, the cooling flow 62 and the mixing flow 60 will be provided to the mixing manifold 12 leading to a low volume output fluid flow 70. Once the mixing manifold 12 and the fluid distributing manifold 20 are at a lower temperature, the cooling fluid flow 62 can be reduced arid the inlet working fluid flow 50 can be slowly varied to achieve a desired temperature and output flow. Simplified control logic block 430 and 440 are used to achieve the desired temperature and flow rate to satisfy a target energy demand by connected downstream equipment.

If the graphite storage segment is at a high or maximum temperature, the working fluid leaving the graphite storage segment will be approximately at the upper temperature and will require cooling before output to conventional equipment. In this case, a significant mixing flow 60 is introduced to mix with working fluid flow 50 being discharged to manage or control the temperature of the output flow 70. The flows 62, 60 and 50 are adjusted by varying the blower speed and corresponding valves to achieve a desired temperature and volume of flow 70 and to effectively operate the system in a manner that is advantageous to downstream equipment while also maintaining the free plate 202 of the distribution manifold and any other external containment structures tied to the flow 62 at a desired temperature.

As the temperature of the graphite storage segment decreases, these flows can be adjusted to maintain a desired output temperature flow ($T_{demand}$) and flow rate. The very high temperatures possible at start-up, even in the distribution manifold 10 and mixing manifold 12 (FIG. 1), are controlled to avoid temperature damage to the distributing manifold 20 and downstream equipment. The fluid distributing manifold 20 includes conventional lower temperature materials and the cooling flow 62 protects the distributing manifold 20 at stand-by conditions and also during start-up of an energy extraction step of the graphite storage segment. The distributing manifold 20 could be made of ceramic material to provide temperature protection, however, appropriate cooling and conventional materials are preferred and used to protect downstream equipment.

The substantial volume of the cavity 6a and 6b and the wails of the support base reduce the direct thermal conduction heat path through the walls and, thus, increase the effective insulation provided by the support block 6 separating the high temperature graphite storage segment from the cooler support temperatures of a support surface or floor of a containment structure.

The side plates 16 are provided as the graphite storage segment 4 is preferably made up of preformed blocks and the individual blocks can be placed in one of two different orientations. This can be appreciated from a review of FIG. 5. By providing a staggered arrangement of the blocks, the graphite storage segment 4 is divided into sections (5 shown, see FIG. 9) in the length of the storage unit and is also divided vertically into sections (5 shown). This allows for some movement of the graphite storage segment caused by thermal expansion, contraction, etc. The longitudinal passages of the graphite storage segment are generally aligned regardless of the orientation of the blocks either in the longitudinal direction of the storage segment or across the storage segment. In light of this, side plates 16 effectively close the sides of the segment to ensure that the fluid flows through the length of the graphite storage segment.

In FIG. 5, it can also be seen that there are a number of elongate ports 120 that are between the graphite blocks and are sized for receiving electrical heating elements. Typically, the elements will also be of a graphite electrode to withstand the temperatures and to transfer energy into the graphite storage segment primarily by radiation. Depending upon the desired maximum temperature of the graphite storage segment, other heat input arrangements can be used.

Figure 9:
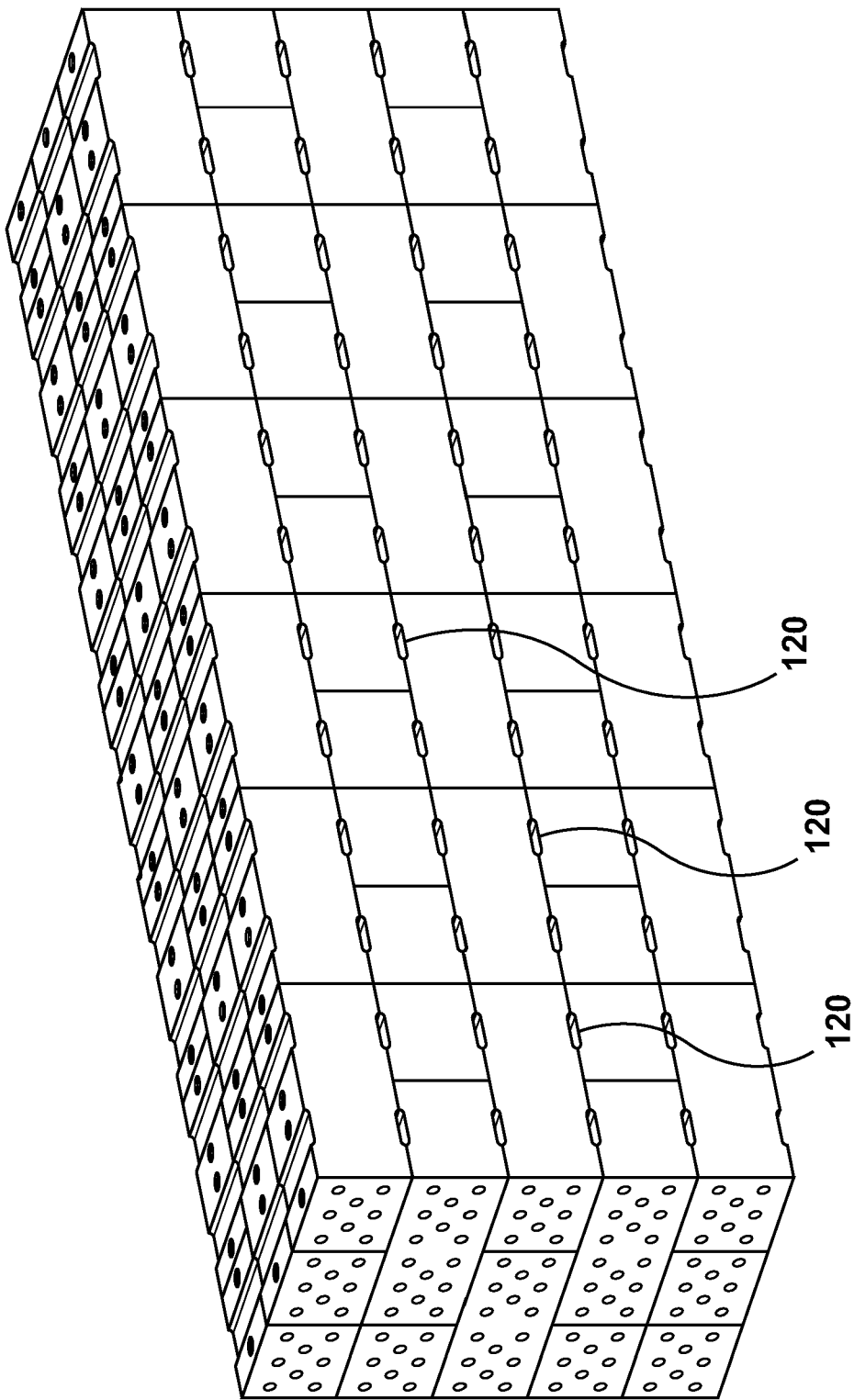
FIG. 9 is a perspective view of the graphite storage segment.
Figure 10:
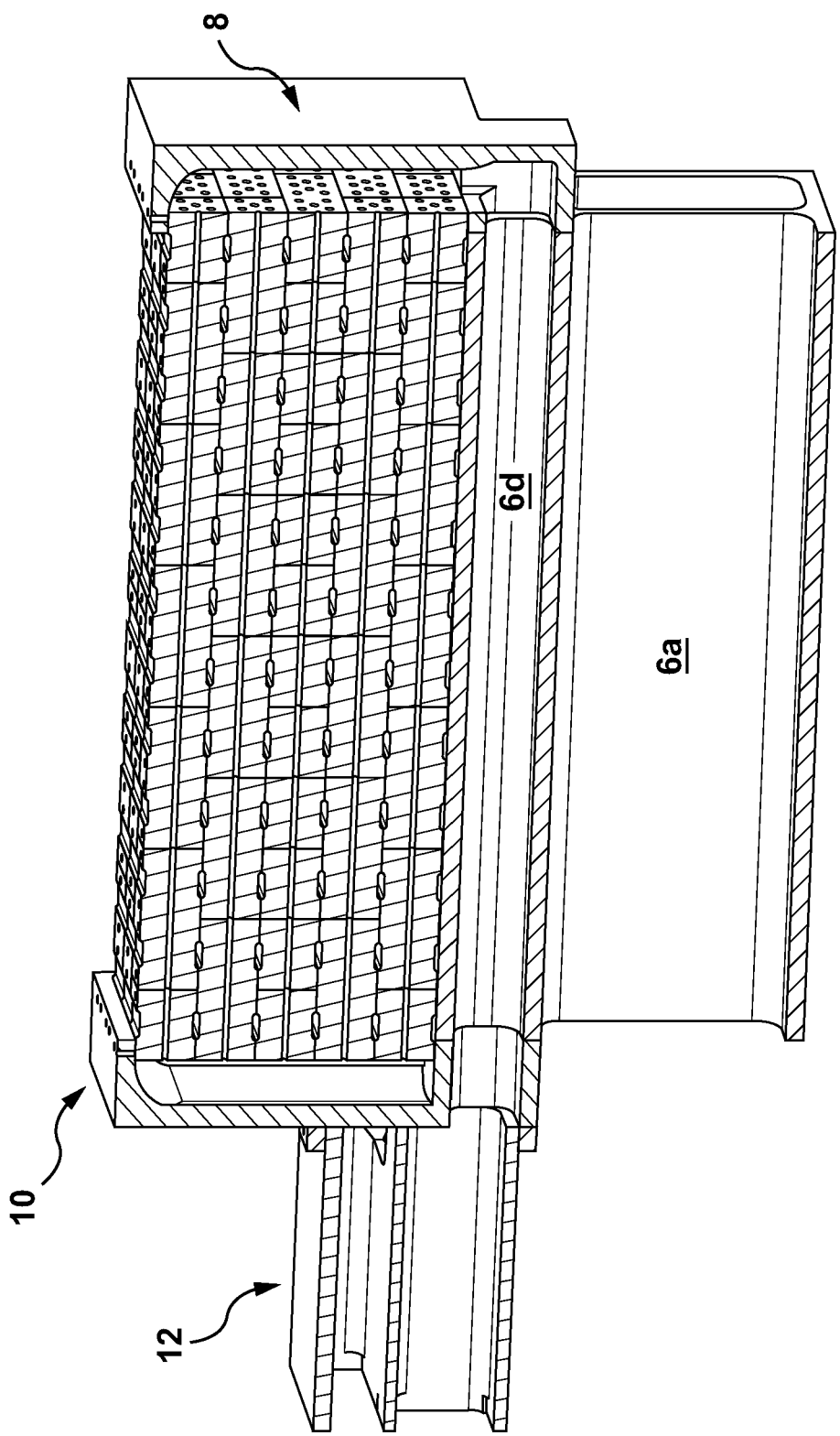
FIG. 10 is a further cross-sectional view taken along line 10-10 of FIG. 7 through the high temperature thermal energy storage and transfer arrangement.
Figure 11:
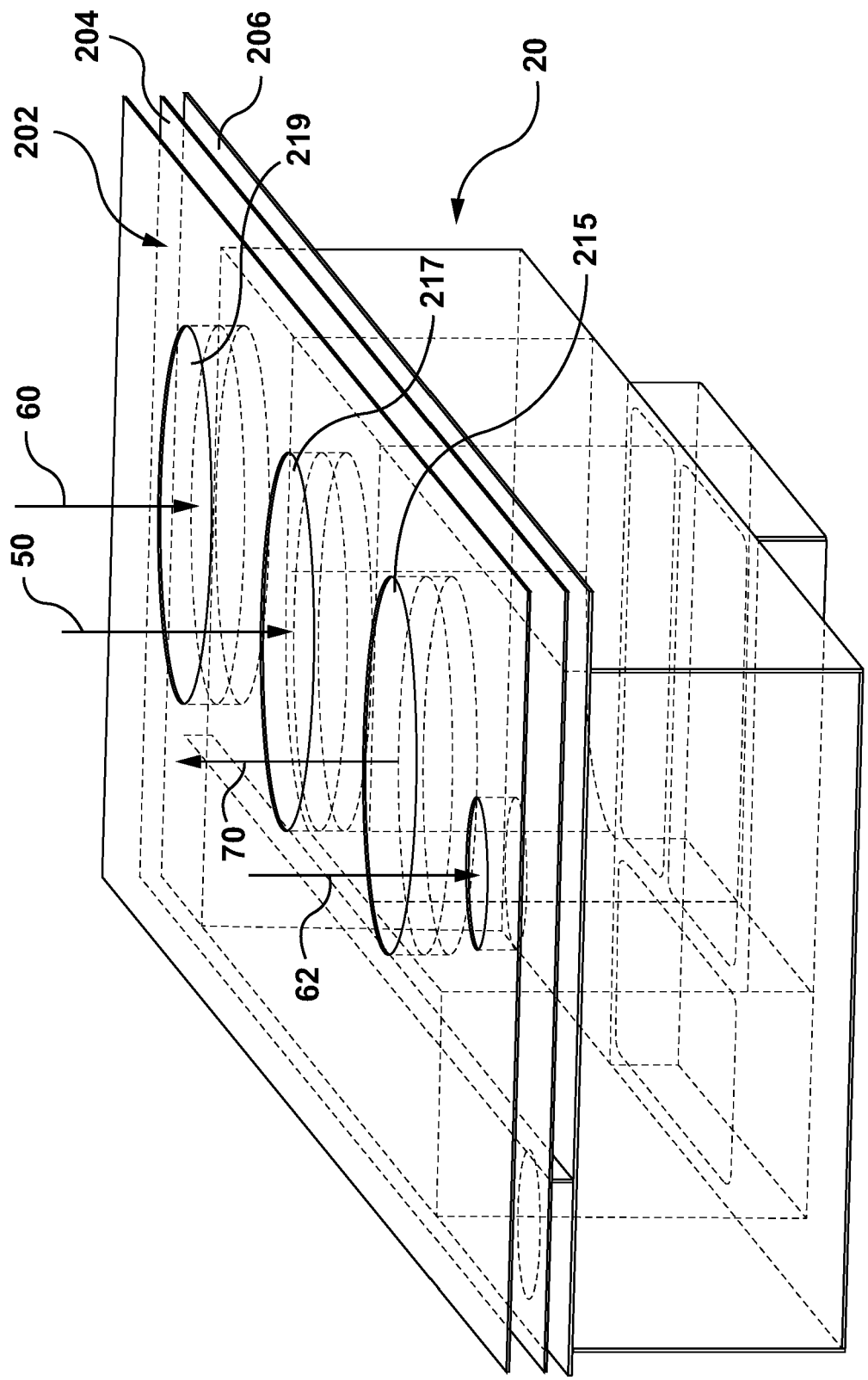
FIG. 11 is a perspective view of the distributing manifold.

FIG. 9 show details of the ports 120 and the top surface shows how elongate slots have been provided on the mating surfaces of the blocks to accommodate the electrodes. Basically, two type are blocks are preferably used and cooperate in the manner shown.

Cooling fluid flow 62 as it passes through the distributing manifold, protects the steel plates of the manifold and downstream equipment. The annealing temperature of steel is about 700° C. and excessive temperatures can change properties and cycling to and from high temperatures may cause damage over time. Cooling reduces this possibility while at the same time, a continuous operation of the blower at a reduced speed to circulate working fluid (and related mixing and cooling flows) in a volume which will keep downstream equipment at a steady-state temperature, even as net thermal loads vary, will greatly extend the lifetime of downstream equipment while also controlling the exterior temperature of the thermal storage system.

An example of this continuous operation is the maintenance of a "spinning reserve" on the electrical grid where a steam turbine is kept at operating temperature and spinning with minimal generation load until an electrical demand spike occurs. In such an event, a sharp demand jump in the volume of stream running through a heat exchanger thermally powered by the energy storage system is met by the control system by instantly increasing the blower speed and adjusting the valves 100a, 106a and 108a such that the appropriate volume of working fluid at the set temperature can be delivered to the external heat exchangers delivering the steam. After the demand eases, the control system drops the blower speed and adjusts the valves to net a desired reduction in btu delivery.

Such a system, if equipped with redundant blowers and back-draft dampers, could operate virtually indefinitely since there are no moving parts within the thermal storage system and would he little variation in temperature of any of the distributing manifold or external components and thus minimal thermal expansion and contraction which typically ages such downstream equipment in conventional cycling combustion thermal systems. Furthermore, the present invention ensures that valves 100a, 106a, and 108a will also be held at relatively steady operating temperatures during this continuous operating state and at the same time, control of radiated energy hack through the mixing manifold can be controlled, as can the temperature of the support structure under the graphite body, should the idling external equipment he sized relative to the thermal storage system such that some working fluid must still traverse the graphite body during such idle state (and thus, some working fluid would he moving through and cooling the passages below the graphite body).

The mixing manifold, distributing manifold and the ceramic base, all utilize a fluid flow to reduce the possibility of temperature damage. These components cooperate with the thermal storage segment and are designed to function over a wide temperature range, namely, the existing temperature limits of thermal storage segments today and the theoretical temperature limits possible in the future.

The control logic 410, as shown in FIGS. 16A and 16B, can be used to provide the power output fluid flow 70 at a temperature ($T_{70}$) suitable for downstream equipment and as set by the user. This desired temperature is indicated as $T_{demand}$.

Control block 420 is used to purge hot fluid in the distributing manifold 20 as part of the start-up process. Control block 430 is then used to reduce the temperature of the working fluid in the mixing manifold. Control block 440 provides logic for maintaining a desired temperature of the output flow 70.

Although various preferred embodiments of the present invention have been described herein in detail, it will be appreciated by those skilled in the art that variations may he made thereto without departing from the scope of the appended claims.

The embodiments of the invention in which an exclusive property or privilege is claimed are as follows:

1. A fluid flow mixing manifold for reducing the temperature of a thermal energy transfer fluid, said fluid flow mixing manifold comprising:
    a divided housing that includes a thermal discharge port, a high temperature fluid input port and a cooling fluid mixing input port;
    said divided housing including a mixing chamber with said cooling fluid mixing input port and said high temperature fluid input port in communication with an input end of said mixing chamber;
    said mixing chamber including a series of mixing members that cause mixing of the thermal energy transfer fluid flowing through said mixing chamber prior to discharge through said thermal discharge port located at an output end of said fluid flow mixing manifold; and
    wherein the fluid flow mixing manifold includes a controller that monitors the temperature of the fluid flow mixing manifold adjacent the thermal discharge port; said controller including a flow control arrangement for regulating the volume of a cooling mixing flow passing through said cooling fluid mixing input port;
    said controller further including an arrangement for regulating the volume of the thermal energy transfer fluid passing through said high temperature fluid input port;
    said controller regulating said thermal energy transfer fluid flow passing through said high temperature input port and said cooling mixing flow passing through the cooling fluid mixing input port to cause a mixed fluid flow passing through said output thermal discharge port to exit at a reduced temperature compared to the thermal energy transfer fluid entering the high temperature fluid input port as regulated by said controller.

2. A fluid flow mixing manifold as claimed in claim 1 wherein said series of mixing members are baffles provided in the mixing chamber.

3. A fluid flow mixing manifold as claimed in claim 2 wherein said baffles are positioned in said mixing chamber to provide a direct radiation block through said mixing chamber.

4. A fluid flow mixing manifold as claimed in claim 3 wherein fluid flow mixing manifold is formed of a ceramic material.

5. A fluid flow mixing manifold as claimed in claim 1 wherein fluid flow mixing manifold is formed of a ceramic material.

6. A fluid flow mixing manifold as claimed in claim 1 wherein
    controller regulates said said thermal energy transfer fluid flow passing through said high temperature input port and said cooling mixing flow passing through the cooling fluid mixing input port to cause the mixed fluid flow passing through said thermal discharge port to be at a temperature below approximately 700° C.

7. A fluid mixing manifold as claimed in claim 1 wherein said controller is adjustable to set a preselected temperature output of the mixed fluid flow.

8. A fluid flow mixing manifold as claimed in claim 1 wherein the divided housing includes therein a cooling mixing flow input passage leading to said cooling fluid mixing input port.

9. A fluid flow mixing manifold as claimed in claim 8 wherein the cooling fluid mixing flew input passage and said mixing chamber are configured to overlap and share a common wall to promote heat exchange therebetween.

10. A fluid flow mixing manifold as claimed in claim 1 in combination with a high temperature thermal storage unit; said high temperature thermal storage unit having an output manifold connected to said high temperature fluid input port accommodating passage and mixing of the thermal energy transfer fluid that initially passes through said high temperature thermal storage unit.

11. A fluid flow mixing manifold in combination with a high temperature thermal storage unit as claimed in claim 10 wherein said high temperature thermal storage unit has a high temperature storage segment with a series of heat transfer passages extending there through for energy offloading to the thermal energy transfer fluid passing through said heat transfer passages; and a series of heaters located within said high temperature storage segment for heating thereof.

12. A fluid flow mixing manifold in combination with a high temperature thermal storage unit as claimed in claim 11 wherein said high temperature thermal storage unit includes a high temperature ceramic base located below and supporting said high temperature storage segment; and wherein said high temperature ceramic base includes a top surface in contact with said high temperature storage segment, side walls extending downwardly from said top surface of said high temperature ceramic base and supporting said top surface of said high temperature ceramic base along a length thereof; and wherein said high temperature ceramic base includes two or more cavities between said side walls and extending parallel to said length of said top surface of said high temperature ceramic base; and wherein at least one of said two or more cavities acts as a pathway for distributing said thermal energy transfer fluid to an inlet end of said high temperature storage segment.

13. A fluid flow mixing manifold in combination with a high temperature thermal storage unit as claimed in claim 11 wherein said side walls are thin relative to a height of said side walls and define a restricted heat conduction path between said top surface of said high temperature ceramic base and a support portion provided at a lower edge of said side walls.

14. A fluid flow mixing manifold in combination with a high temperature thermal storage unit as claimed in claim 13 wherein said at said two or more cavities has at least two adjacent cavities located side by side below said top surface of said high temperature ceramic base having a common intermediate wall there between extending along the length of said top surface of said high temperature ceramic base.

15. A fluid flow mixing manifold in combination with a high temperature thermal storage unit as claimed in claim 14 wherein said at least two adjacent cavities have bottom surfaces extending along the length of said top surface of said high temperature ceramic base and located at a position intermediate the height of said side walls.

16. A fluid flow mixing manifold in combination with a high temperature thermal storage unit as claimed in claim 15 including a ceramic inlet manifold at one end of said high temperature storage segment forming a working fluid connection between said high temperature ceramic base and high temperature storage segment.

* * * * *